(12) United States Patent
Gao et al.

(10) Patent No.: US 11,527,022 B2
(45) Date of Patent: Dec. 13, 2022

(54) METHOD AND APPARATUS FOR TRANSFORMING HAIR

(71) Applicant: BEIJING DAJIA INTERNET INFORMATION TECHNOLOGY CO., LTD., Beijing (CN)

(72) Inventors: Yuan Gao, Beijing (CN); Huijuan Huang, Beijing (CN); Yang Sun, Beijing (CN); Congli Song, Beijing (CN); Wen Zheng, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/122,932

(22) Filed: Dec. 15, 2020

(65) Prior Publication Data
US 2022/0051451 A1 Feb. 17, 2022

(30) Foreign Application Priority Data

Aug. 11, 2020 (CN) .......................... 202010802416.0

(51) Int. Cl.
*G06T 11/00* (2006.01)
*G06T 7/90* (2017.01)
*G06T 7/11* (2017.01)

(52) U.S. Cl.
CPC .............. *G06T 11/001* (2013.01); *G06T 7/11* (2017.01); *G06T 7/90* (2017.01); *G06T 2207/10024* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2015/0091938 A1* | 4/2015 | Mallick | G06K 9/38 345/595 |
| 2016/0154993 A1* | 6/2016 | Aarabi | H04N 1/4074 382/118 |
| 2017/0206678 A1* | 7/2017 | Kowalczyk | G06K 9/6212 |
| 2018/0225828 A1* | 8/2018 | Guo | G06N 3/0454 |
| 2021/0295483 A1* | 9/2021 | Huang | G06T 11/00 |

* cited by examiner

*Primary Examiner* — Edward Martello
(74) *Attorney, Agent, or Firm* — Knobbe Martens Olson & Bear LLP

(57) ABSTRACT

A method for transforming hair relates to the field of image processing, and can achieve a function of transforming the hair with a more consistent and natural color with respect to that before the hair of a character is transformed. The method for transforming the hair includes: acquiring a first sample image and a second sample image; determining a first color guide map based on the first sample image and the second sample image; acquiring a first image processing model by training with the first sample image and the first color guide map as training data and the second sample image as supervision information; and transforming, based on the first image processing model, hair in an image selected by a user.

20 Claims, 13 Drawing Sheets a b c

METHOD AND APPARATUS FOR TRANSFORMING HAIR

CROSS-REFERENCE TO RELATED APPLICATIONS

The present disclosure is based on and claims priority under 35 U.S.C. 119 to Chinese patent application No. 202010802416.0, filed on Aug. 11, 2020, in the China National Intellectual Property Administration, the disclosure of which is herein incorporated by reference in its entirety.

TECHNICAL FIELD

Embodiments of the present disclosure relate to the field of image processing, and in particular relate to a method and an apparatus for transforming hair.

BACKGROUND

At present, in order to increase the interest of users in video applications, most of the video applications have a hair transformation function, i.e., transforming the hair of a user in a picture or video provided by the user to another hairstyle. In the prior art, when the hair transformation function is implemented, a hair color after the hair transformation is unfavorably inconsistent and less natural with respect to the hair color before the hair transformation.

SUMMARY

The present disclosure relates to a method and an apparatus for transforming hair.

In an aspect, a method for transforming hair is provided. The method includes:
  acquiring a first sample image and a second sample image, wherein the second sample image and the first sample image include a same character with different hairstyles; determining a first color guide map based on the first sample image and the second sample image, wherein a hair generating area in the first color guide map is the same as a second hair segmenting area of the second sample image, and a color of the hair generating area is acquired based on pixels representing hair in a first hair segmenting area of the first sample image; acquiring a first image processing model by training with the first sample image and the first color guide map as training data and the second sample image as supervision information; and transforming, based on the first image processing model, hair in an image selected by a user.

In another aspect, an electronic device is provided. The electronic device includes: a processor, and a memory configured to store at least one computer program including at least one instruction executable by the processor; wherein the at least one instruction, when executed by the processor, causes the processor to perform a method including:
  acquiring a first sample image and a second sample image, wherein the second sample image and the first sample image include the same character with different hairstyles; determining a first color guide map based on the first sample image and the second sample image, wherein a hair generating area in the first color guide map is the same as a second hair segmenting area of the second sample image, and a color of the hair generating area is acquired based on pixels representing hair in a first hair segmenting area of the first sample image; acquiring a first image processing model by training with the first sample image and the first color guide map as training data and the second sample image as supervision information; and transforming, based on the first image processing model, hair in an image selected by a user.

DETAILED DESCRIPTION

The technical solutions in the embodiments of the present disclosure are clearly and completely described below with reference to the accompanying drawings, in order to allow those of ordinary skills in the art to have a better understanding of the technical solutions of the present disclosure.

It should be noted that the terms "first," "second," and the like in the specification and claims of the present disclosure and the above-mentioned drawings are for the purpose of distinguishing similar objects, instead of necessarily describing a specific sequence or a successive order. It should be understood that the data used in such a way are interchangeable where appropriate, such that the embodiments of the present disclosure described herein can be implemented in a sequence other than those illustrated or described herein. The examples set forth in the following description of embodiments do not represent all examples consistent with the present disclosure. Instead, they are merely examples of apparatuses and methods consistent with aspects related to the present disclosure as recited in the appended claims.

In addition, unless otherwise specified, "/" in the description of the embodiments of the present disclosure indicates a meaning of "or," for example, "A/B" indicates A or B; the term "and/or" herein is merely to describe an association relationship between associated objects, indicating three types of relationships. For example, A and/or B, can be expressed as: A exists alone, A and B exist concurrently, and B exists alone. In addition, the term "a plurality of" in the description of the embodiments of the present disclosure refers to two or more.

The technical terms involved in the present disclosure are introduced at first.

RGB values: the RGB color mode (also translated to "red, green, and blue") is a color standard in the industry, where a variety of colors may be acquired by variation of the three color channels of R (Red), G (Green), and B (Blue) and their mutual overlay. RGB represents the colors of the three channels of red, green, and blue. This standard includes almost all colors perceivable by human vision, and is one of the most widely used color systems at present. The RGB values refer to values of the three channels of a pixel and are represented by integers. In general, a range of each RGB channel value includes 0, 1, 2 . . . to 255. Although the maximum value is 255, 0 is also one of the values, and thus a total of 256 values are included. For example, the RGB values of a certain pixel are (122, 255, 0).

The following describes the application scenarios of the technical solutions according to the present disclosure.

Figure 1:
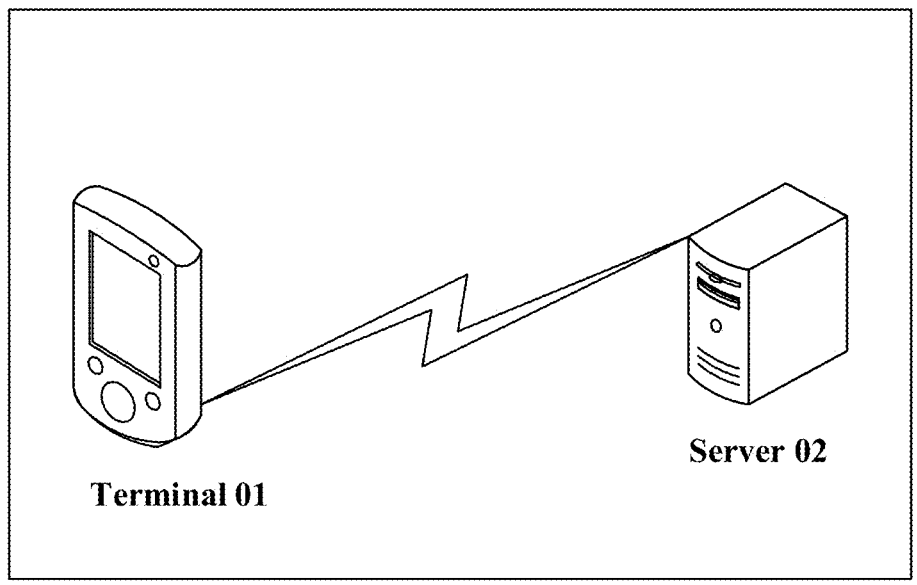
FIG. 1 illustrates a schematic diagram of an implementation environment of a method for generating a hair transformation model and a method for transforming hair according to an embodiment of the present disclosure.

FIG. 1 illustrates a schematic diagram of an implementation environment of a method for transforming hair according to an embodiment of the present disclosure. The method for transforming the hair according to the embodiment of the present disclosure is applicable to the environment of this embodiment. As illustrated in FIG. 1, the implementation environment includes a terminal 01 and a server 02, wherein the terminal 01 communicates with the server 02 through wired communication or wireless communication.

The terminal 01 in this embodiment of the present disclosure is a device with an image processing function, such as a mobile phone, a tablet computer, a desktop computer, a laptop, a handheld computer, a notebook computer, an ultra-mobile personal computer (UMPC), a netbook, as well as a cellular phone, a personal digital assistant (PDA), and an augmented reality (AR)/virtual reality (VR) device. The form of the terminal is not specially limited in the embodiments of the present disclosure. The terminal 01 may undergo man-machine interaction in one or more forms of such as a keyboard, a touch panel, a touch screen, a remote control, voice interaction, or a handwriting device.

The server 02 in this embodiment of the present disclosure is a server, or a server cluster composed of a plurality of servers, or a cloud computing service center, which is not limited in the present disclosure.

The server 02 may be a server for processing images, such as character images. The server 02 may process a character image and then send the processed character image to the terminal 01 in a wired or wireless manner.

Figure 2:
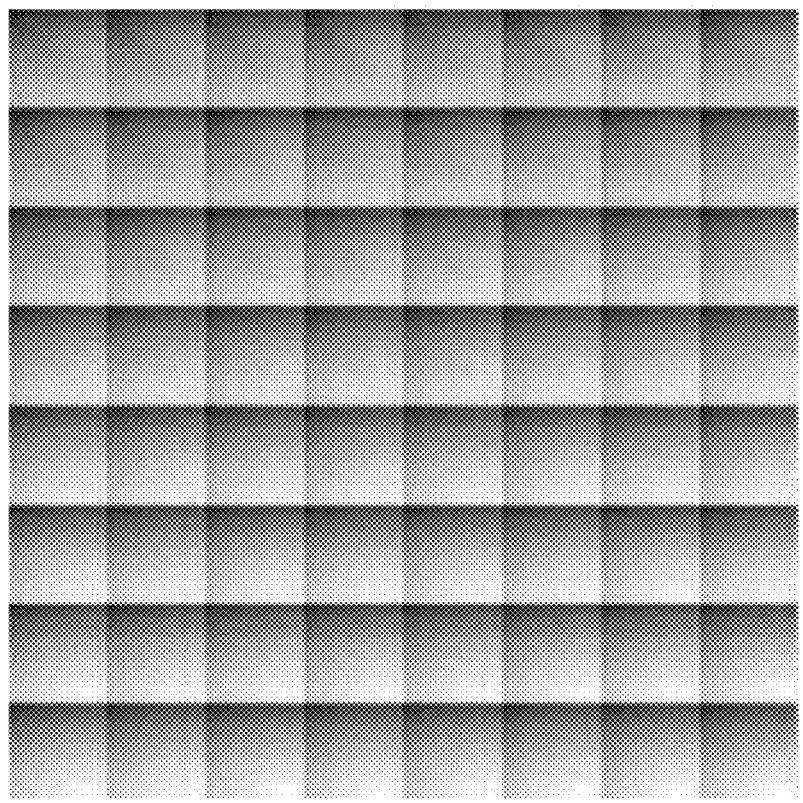
FIG. 2 schematically illustrates a look-up table (LUT) map.

At present, in order to enable the function of hair transformation (i.e., converting a hairstyle in a character image to another hairstyle, such that a hair color in the transformed character image is close to that of the character image before the transformation), the prior art includes a method for converting the hairstyle in the character image based on a hairstyle converting model, and a method for adjusting the hair color in the converted character image to a degree similar to a hair color in a source character image. A process of adjusting the hair color is an image post-processing process, in which two methods of a lookup table and mean-variance color transformation are generally used. For the method of lookup table, a LUT (a display lookup table) map as illustrated in FIG. 2 needs to be designed based on the experience of a designer; then, RGB values of each pixel in the converted character image are converted to coordinates based on a predefined formula; and then the corresponding RGB values are looked up from the LUT map, and finally filled into the corresponding pixel. Since the whole solution above needs to be based on the experience of a person, it is difficult to adapt to the complicated application scenarios where users have different hair colors today, leading to poor consistency in color between the transformed hair and the untransformed hair. For the method of mean-variance color transformation, the mean and variance of the RGB values corresponding to a color of an original hairstyle, and the mean and variance of the RGB values corresponding to a color of a predefined hairstyle need to be computed, and then, color transformation is further performed based on the means and variances of the two. Accordingly, the computation burden is high, and this method is susceptible to abnormal values of the RGB values corresponding to the color of the original hairstyle (for example, the effect of external highlight on the color), making the color of the finally transformed predefined hairstyle unnatural.

In view of the above problems, an embodiment of the present disclosure provides a method for transforming hair, by which a first image processing model is acquired by training. The method for transforming the hair includes a method for generating a hair transformation model, where an apparatus for generating the hair transformation model is an execution subject. The apparatus for generating the hair transformation model includes an electronic device, which is a terminal or a server, as appropriate, in the above implementation environment.

Figure 3:
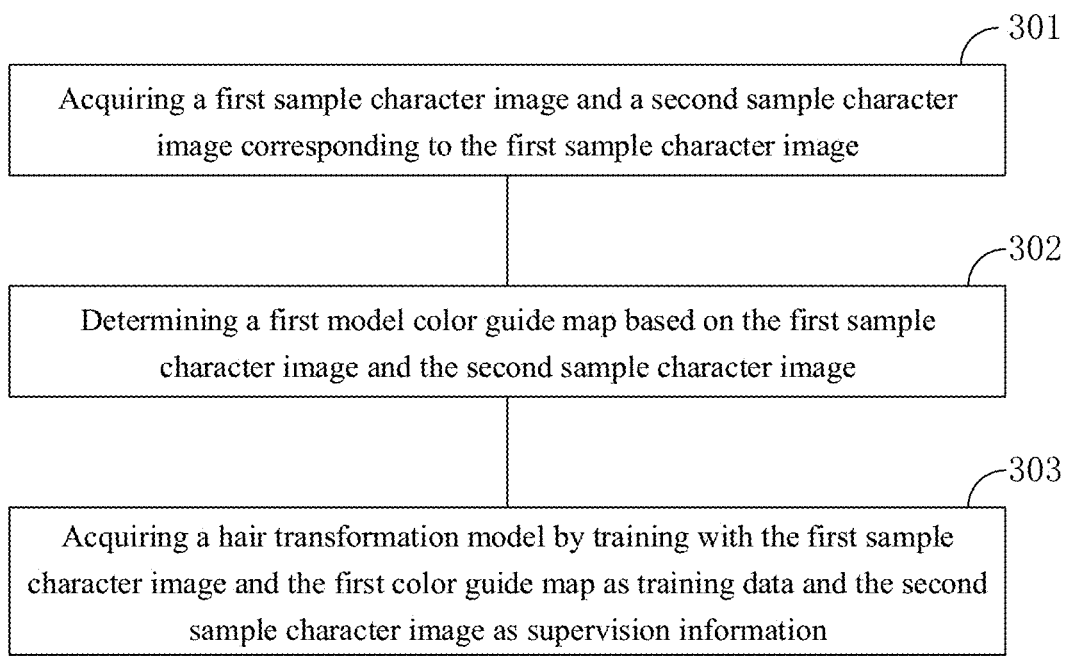
FIG. 3 illustrates a schematic flowchart of a method for generating a hair transformation model according to an embodiment of the present disclosure.

Referring to FIG. 3, an embodiment of the present disclosure provides a method for transforming hair applicable to the apparatus for generating the hair transformation model. The method includes 301 to 303.

In 301, a first sample character image and a second sample character image corresponding to the first sample character image are acquired.

The second sample character image is acquired based on the first sample character image, for example, by using a predefined deep learning algorithm. A hairstyle of a character in the second sample character image is different from that in the first sample character image, and a similarity between a hair color of the character in the second sample character image and a hair color of the character in the first sample character image is less than or equal to a predefined value. In some embodiments, the first sample character image is a first sample image, and the second sample character image is a second sample image. The second sample image and the first sample image include a same character with different hairstyles.

Figure 4:
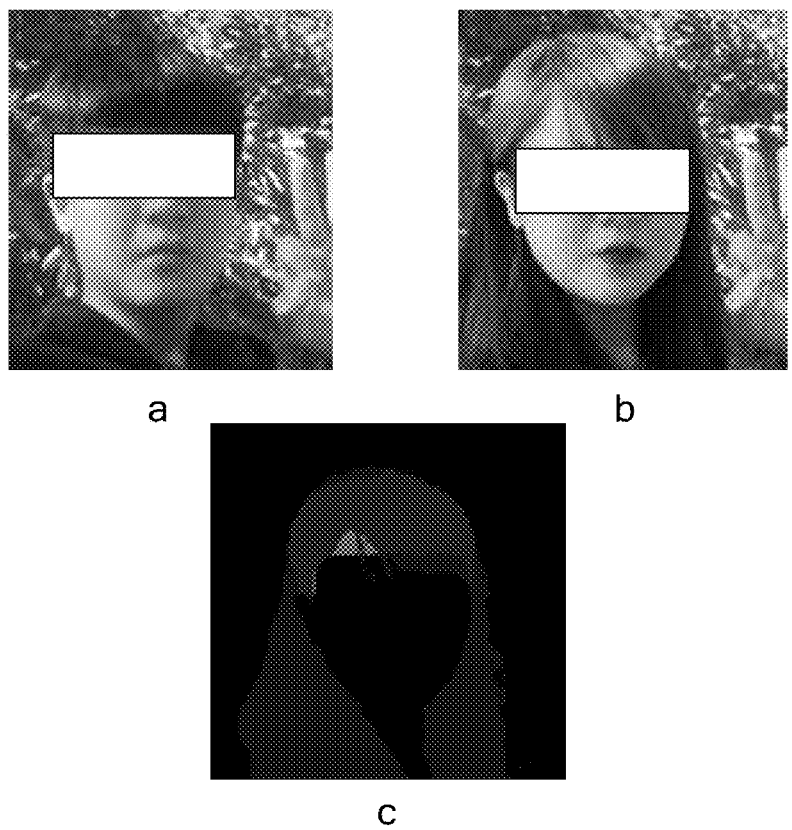
FIG. 4 schematically illustrates a pair of sample character images and a corresponding first color guide map according to an embodiment of the present disclosure.

In some embodiments, the first sample character image above may be acquired directly from the Internet, and the second sample character image may be acquired by processing the first sample character image using a CycleGAN neural network. As illustrated in FIG. 4, a in FIG. 4 illustrates the first sample character image, and b in FIG. 4 illustrates the second sample character image processed by the CycleGAN neural network. A difference between the two lies in different hairstyles, and a certain difference also lies in the hair color.

It should be noted that the CycleGAN neural network in reality is large in size, requires numerous computing resources, and may not be controlled in details. As a result, if a hairstyle in a certain character image is intended to be transformed using the CycleGAN neural network, a random hairstyle may be finally obtained for the character in the transformed character image, with a significant difference in the hair color of the character with respect to the hair color of the character in the untransformed character image. Therefore, the CycleGAN neural network in the present disclosure is configured to generate sample data for the hair transformation model. At the same time, based on different requirements (for example, transforming a short hairstyle into a long hairstyles, or transforming the long hairstyle into the short hairstyle, transforming among different short hairstyles, and transforming among different long hairstyles) of the present disclosure for the hair transformation models, the CycleGAN neural network may be either controlled in a general direction to generate corresponding sample data, or only controlled to generate a large number of character image pairs with different hairstyles, from which corresponding sample data may be chosen, which is not specifically limited by the embodiments of the present disclosure.

The present disclosure is not limited to acquiring the sample data by using the CycleGAN neural network, which may also be used in any other possible manners.

In 302, a first color guide map is determined based on the first sample character image and the second sample character image.

The first color guide map includes the same hair generating area as the hair segmenting area in the second sample character image, that is, the hair generating area in the first color guide map is the same as a second hair segmenting area in the second sample image; and a color of the hair generating area in the first color guide map is acquired based on a hair color in the first sample character image. In some embodiments, the hair color includes the color of pixels representing the hair. That is, the color of the hair generating area is acquired based on the pixels representing the hair in the first hair segmenting area of the first sample image.

In some embodiments, the first color guide map as illustrated in c in FIG. 4 includes the same hair generating area as the hair segmenting area (i.e. the hairstyle of the character) in the second sample character image, and determining factors of the color of the hair generating area include the hair color in the first sample character image.

In 303, a hair transformation model is acquired by training with the first sample character image and the first color guide map as training data and the second sample character image as supervision information.

In some embodiments, the hair transformation model includes a first image processing model, which is acquired by training with the first sample image and the first color guide map as training data and the second sample image as supervision information.

A supervised learning algorithm used in 303 may be any possible algorithm, which is not specifically limited here.

When the hair generating area in the first color guide map is the same as the hair segmenting area in the second sample character image, the determining factors of the color of the hair generating area in the first color guide map include the hair color in the first sample character image. The hair transformation model is acquired by training with the first sample character image and the first color guide map as training data, and the second sample character image as the supervision information. Then, if the hair transformation model is intended to transform the hair in a source character image when necessary, the source character image may be used to determine a predefined color guide map with a target hairstyle (i.e. a target hair generating area) and a hair color that is similar to the hair color in the first sample character image, and then the source character image and the predefined color guide map may be input into the hair transformation model to acquire a target character image with the hairstyle being a target hairstyle and the hair color close to the hair color in the source character image.

In some embodiments, the source character image includes a source image before image processing, and the target character image includes a target image after the image processing. The source image is a source character image when including a character, a source landscape image when including a landscape, or a source animal image when including an animal; and the target image is a target character image when including a character, a target landscape image when including a landscape, or a target animal image when including an animal.

In the above embodiments, when the hair transformation model is trained, a plurality of sample pairs are first acquired, wherein a first sample character image and a second sample character image in each of the plurality of the sample pairs are different in hairstyle, and the second sample character image is acquired from the first sample character image; and then, a corresponding first color guide map is generated based on these sample pairs, wherein a hair generating area in the first color guide map is the same as a hair segmenting area in the second sample character image, and has a color that is acquired based on the color of hair in the first sample character image. Finally, a hair transformation model may be acquired by training with the first sample character image and the first color guide map as training data, and the second sample character image as supervision information. In this way, the acquired hair transformation model may output a character image with hair transformed after receiving a character image and information indicating a corresponding hairstyle.

Figure 5:
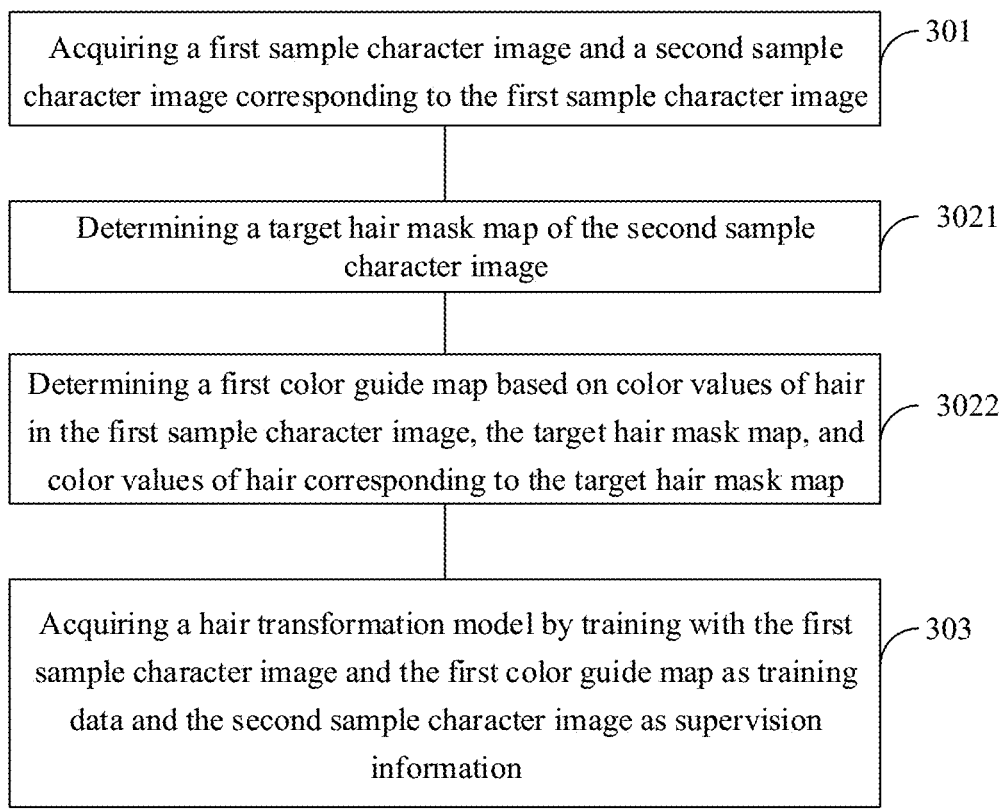
FIG. 5 illustrates a schematic flowchart of another method for generating a hair transformation model according to an embodiment of the present disclosure.

In some embodiments, with reference to FIG. 3, 302 includes 3021 and 3022 as illustrated in FIG. 5.

In 3021, a target hair mask map of the second sample character image is determined.

Figure 6:
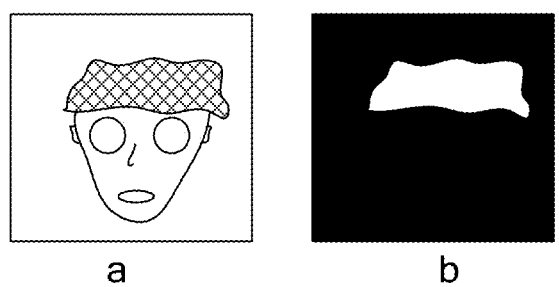
FIG. 6 schematically illustrates a pair of target hair mask maps according to an embodiment of the present disclosure.

In some embodiments, in 3021, the hair in the second sample character image is segmented based on a predefined hair segmenting network, and the target mask map is configured to indicate the second hair segmenting area. Taking the first sample character image as the image illustrated in a in FIG. 6 as an example, the target hair mask map is as illustrated in b in FIG. 6.

In 3022, a first color guide map is determined based on color values of hair in the first sample character image, the target hair mask map and color values of hair corresponding to the target hair mask map.

In the technical solution according to the above embodiments of the present disclosure, the hair in the second sample character image may be independently segmented to form a corresponding target hair mask map; and then a first color guide map may be determined based on color values of hair in the first sample character image, the target hair mask map and color values of the hair corresponding to the target hair mask map.

In some embodiments, after the target hair mask map of the second sample image is determined, first color values of the pixels representing the hair in the first sample image may be determined; then, second color values of the pixels representing the hair in the target hair mask map may be determined; and the first color guide map may be determined based on the first color values, the target hair mask map, and the second color values.

Figure 7:
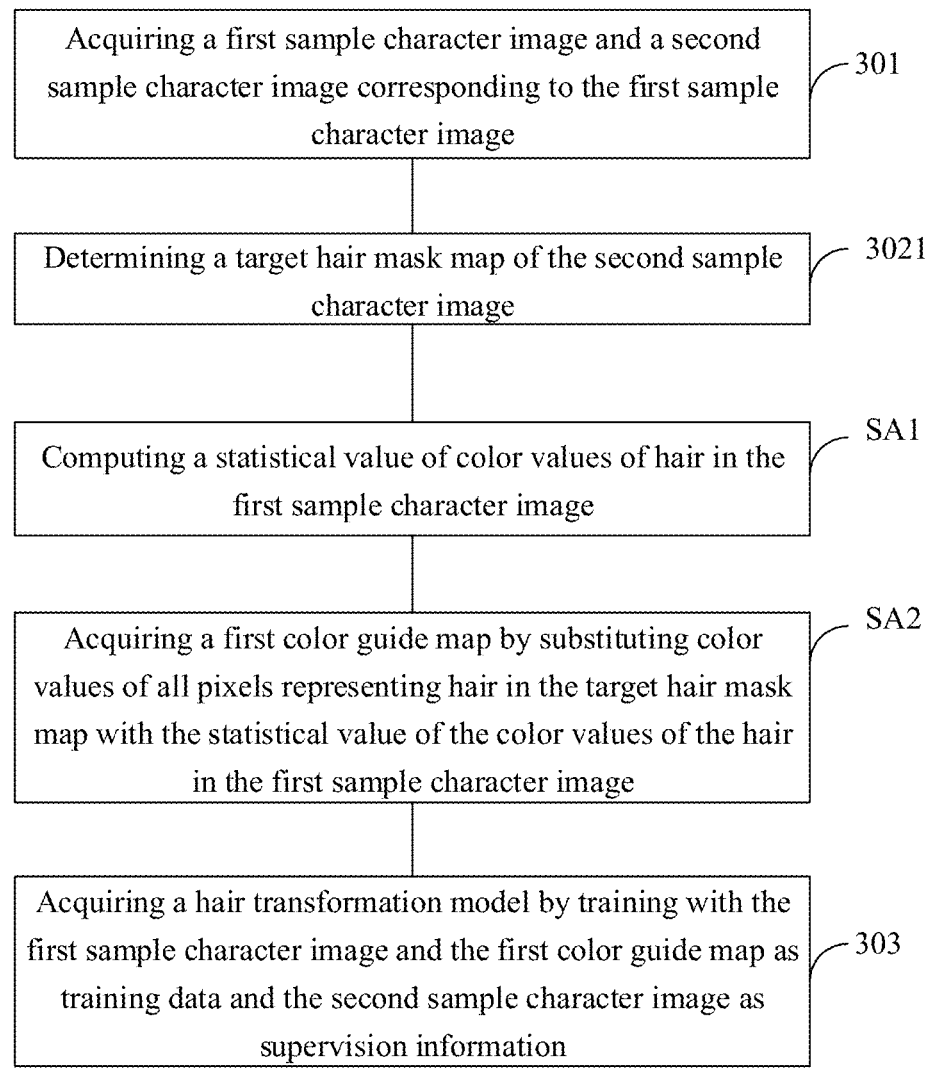
FIG. 7 illustrates a schematic flowchart of another method for generating a hair transformation model according to an embodiment of the present disclosure.

In some embodiments, with reference to FIG. 5, 3022 includes SA1 and SA2 as illustrated in FIG. 7.

In SA1, a statistical value of color values of hair in the first sample character image is computed.

In SA2, a first color guide map is acquired by substituting color values of all pixels representing hair in the target hair mask map with the statistical value of the color values of the hair in the first sample character image.

In some embodiments, the color values of the pixels representing the hair in the first sample image are the first color values, and a statistical value of the first color values is a first statistical value. The first color guide map is acquired by substituting the second color values of the pixels representing the hair in the target hair mask map with the first statistical value.

Figure 8:
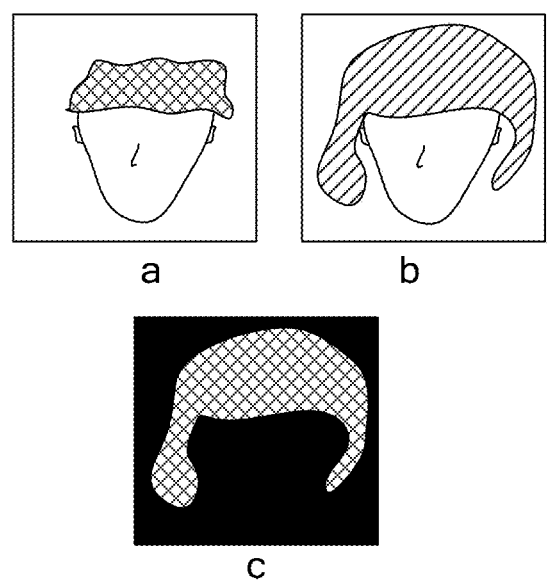
FIG. 8 schematically illustrates a first color guide map according to an embodiment of the present disclosure.

In some embodiments, the first sample character image is as illustrated in a in FIG. 8, the second sample character image is as illustrated in b in FIG. 8, and then, the finally acquired first color guide map is as illustrated in c in FIG. 8.

In some embodiments, the hair transformation model plays a role of changing a short hairstyle in a source character image into a long hairstyle. When the second sample character image is acquired by using CycleGAN based on the first sample character image, the color of extra hair in the second sample character image with respect to the first sample character image is more probably dissimilar to the color of the hair in the first sample character image. Therefore, if a first model guide map is generated by only using the method in FIG. 7, the color of the hair in the target character image that is acquired based on the finally trained hair transformation model is less similar to the color of the hair in the source character image, due to great differences in the supervision information and the training samples.

Figure 9:
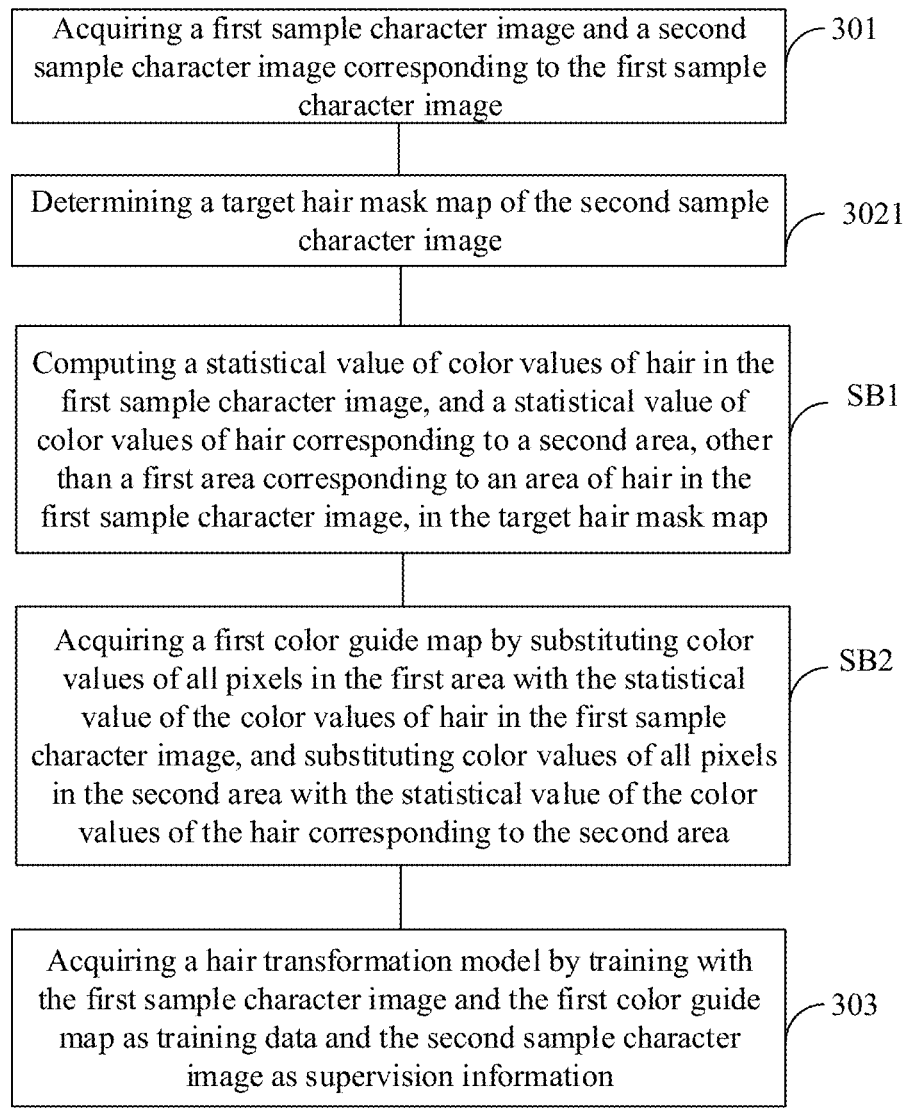
FIG. 9 illustrates a schematic flowchart of another method for generating a hair transformation model according to an embodiment of the present disclosure.

In some embodiments, when an area of the hair in the second sample character image is larger than an area of the hair in the first sample character image, the relevant expression in 302 that the color of the hair generating area in the first color guide map is acquired based on the color of the hair in the first sample character image includes: the color of the hair generating area in the first color guide map is acquired based on the color of the hair in the first sample character image and the color of the hair in the second sample character image. That is, when the second hair segmenting area is larger than the first hair segmenting area, the color of the hair generating area is acquired based on the pixels representing the hair in the first hair segmenting area and the pixels representing the hair in the second hair segmenting area. With reference to FIG. 5, 3022 includes SB1 and SB2 as illustrated in FIG. 9.

In SB1, a statistical value of color values of hair in the first sample character image, and a statistical value of color values of hair corresponding to a second area, other than a first area corresponding to an area of hair in the first sample character image, in the target hair mask map are computed.

In SB2, a first color guide map is acquired by substituting color values of all pixels representing hair in the first area with the statistical value of the color values of hair in the first sample character image, and substituting color values of all pixels representing hair in the second area with the statistical value of the color values of the hair corresponding to the second area.

In some embodiments, the color values of the pixels representing the hair in the first sample image include first color values; a statistical value of the first color values include a first statistical value; and a second area of the target hair mask map corresponds to a second statistical value, wherein the second area is an area other than a first area in the target hair mask map, and the first area is an area corresponding to the first hair segmenting area in the target hair mask map. The first color guide map is acquired by substituting the second color values of pixels representing hair in the first area with the first statistical value, and substituting the second color values of pixels representing hair in the second area with the second statistical value.

Figure 10:
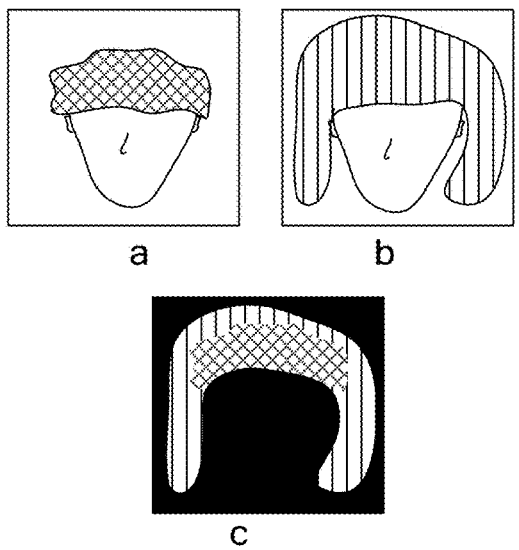
FIG. 10 schematically illustrates further first color guide map according to an embodiment of the present disclosure.

In some embodiments, with the first sample character image as illustrated in a in FIG. 10, the statistical value of the color values of the hair in the first sample character image is a statistical value corresponding to the color of the hair illustrated in a in FIG. 10; and with the second sample character image as illustrated in c in FIG. 10, the first color guide map is finally acquired as illustrated in c in FIG. 10. In addition, compared with the hairstyle illustrated in b in FIG. 10, the hairstyle illustrated in c in FIG. 10 has fewer bangs, and an area with these bangs areas is not needed to be filled. The same is true for the subsequent same case.

Based on the above technical solution, a method for training the image processing model is intended to generate a hair transformation model that changes a short hairstyle in a source character image to a long hairstyle, such that a first color guide map may reflect both the overall color of the hair in the first sample character image and possible gradation of the color of the hair in the case of long hairstyle.

In some embodiments, the hair transformation model plays a role of transforming a long hairstyle in the source character image to a short hairstyle. When the second sample character image is acquired by using CycleGAN based on the first sample character image, the color of extra hair in the first sample character image with respect to the second sample character image is more probably dissimilar to the color of the hair in the second sample character image. Therefore, when a user only needs that the color of the target character image is similar to the color of the part of hair corresponding to the short hairstyle (the target hairstyle) in the source character image, the finally acquired color of the hair that may be output by the hair transformation model is more uniform compared with the color of the hair in the source character image if the first model guide map is generated by using the method in FIG. 7. However, due to great differences in the supervision information and the training samples, the color of the hair in the target character image that is acquired based on the finally trained hair transformation model is highly similar to the overall color of the hair in the source character image, but is less similar to the color of the area corresponding to the hair of the short hairstyle in the source character image, which may not meet the needs of the user.

Figure 11:
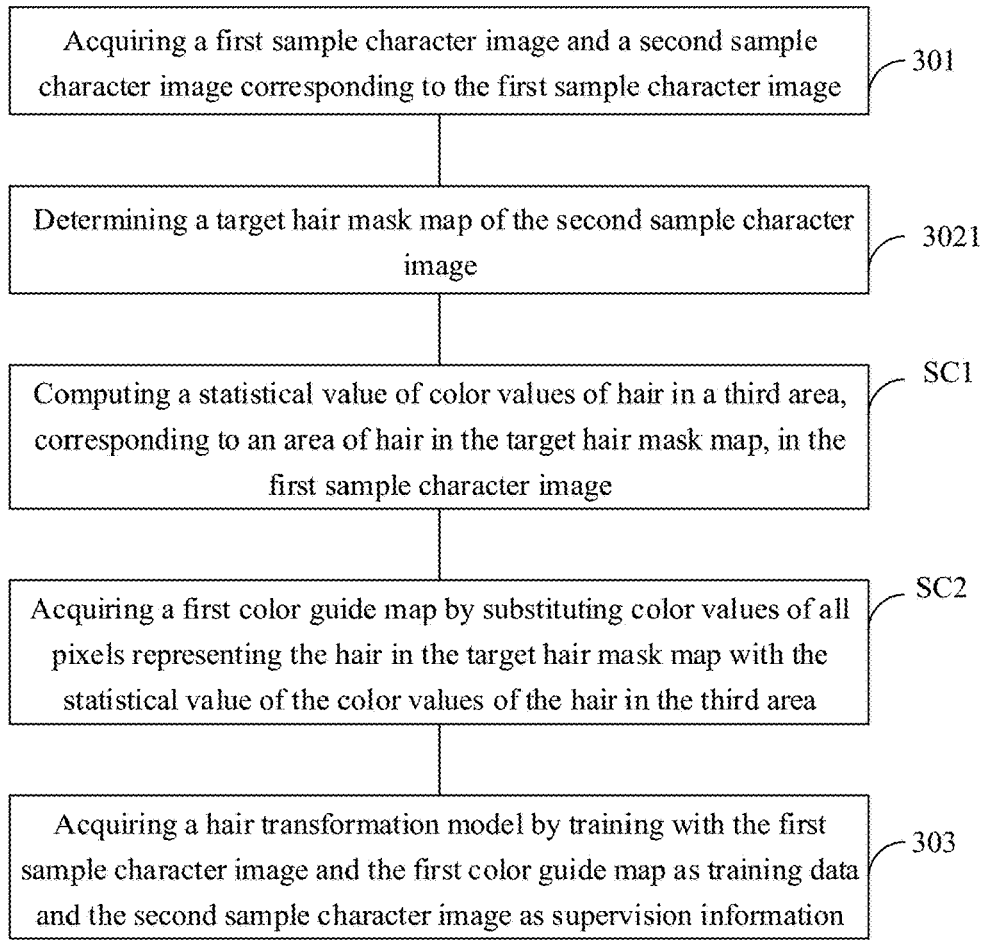
FIG. 11 illustrates a schematic flowchart of another method for generating a hair transformation model according to an embodiment of the present disclosure.

In some embodiments, in order to avoid this, with reference to FIG. 5, 3022 includes SC1 and SC2 as illustrated in FIG. 11.

In SC1, a statistical value of color values of hair in a third area, corresponding to an area of hair in the target hair mask map, in the first sample character image is computed.

In SC2, a first color guide map is acquired by substituting color values of all pixels representing the hair in the target hair mask map with the statistical value of the color values of the hair in the third area.

In some embodiments, in the case that the first hair segmenting area is larger than the second hair segmenting area, the color values of the pixels representing the hair in the first sample image are first color values. A third statistical value corresponding to a third area of the first hair segmenting area is computed based on the first color values, wherein the third area corresponds to an area representing the hair in the target hair mask map; and the first color guide map is acquired by substituting the second color values of the pixels in the area representing the hair in the target hair mask map with the third statistical value corresponding to the third area.

Figure 12:
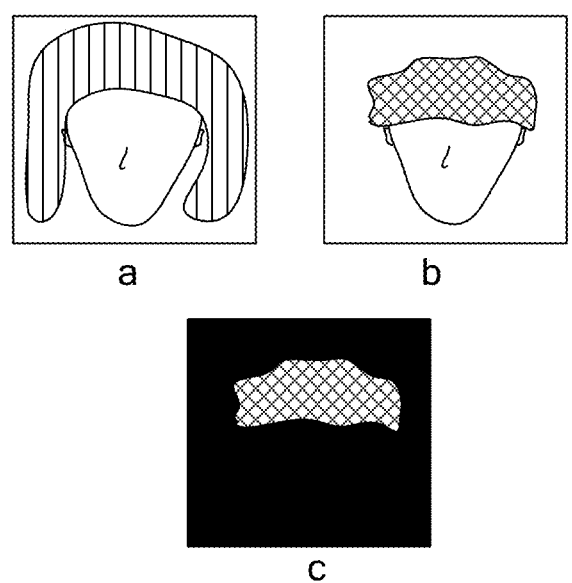
FIG. 12 schematically illustrates further first color guide map according to an embodiment of the present disclosure.

In some embodiments, taking the first sample character image as illustrated in a in FIG. 12 and the second sample character image as illustrated in b in FIG. 12 as examples, the first color guide map is finally acquired as illustrated in c in FIG. 12.

Figure 13:
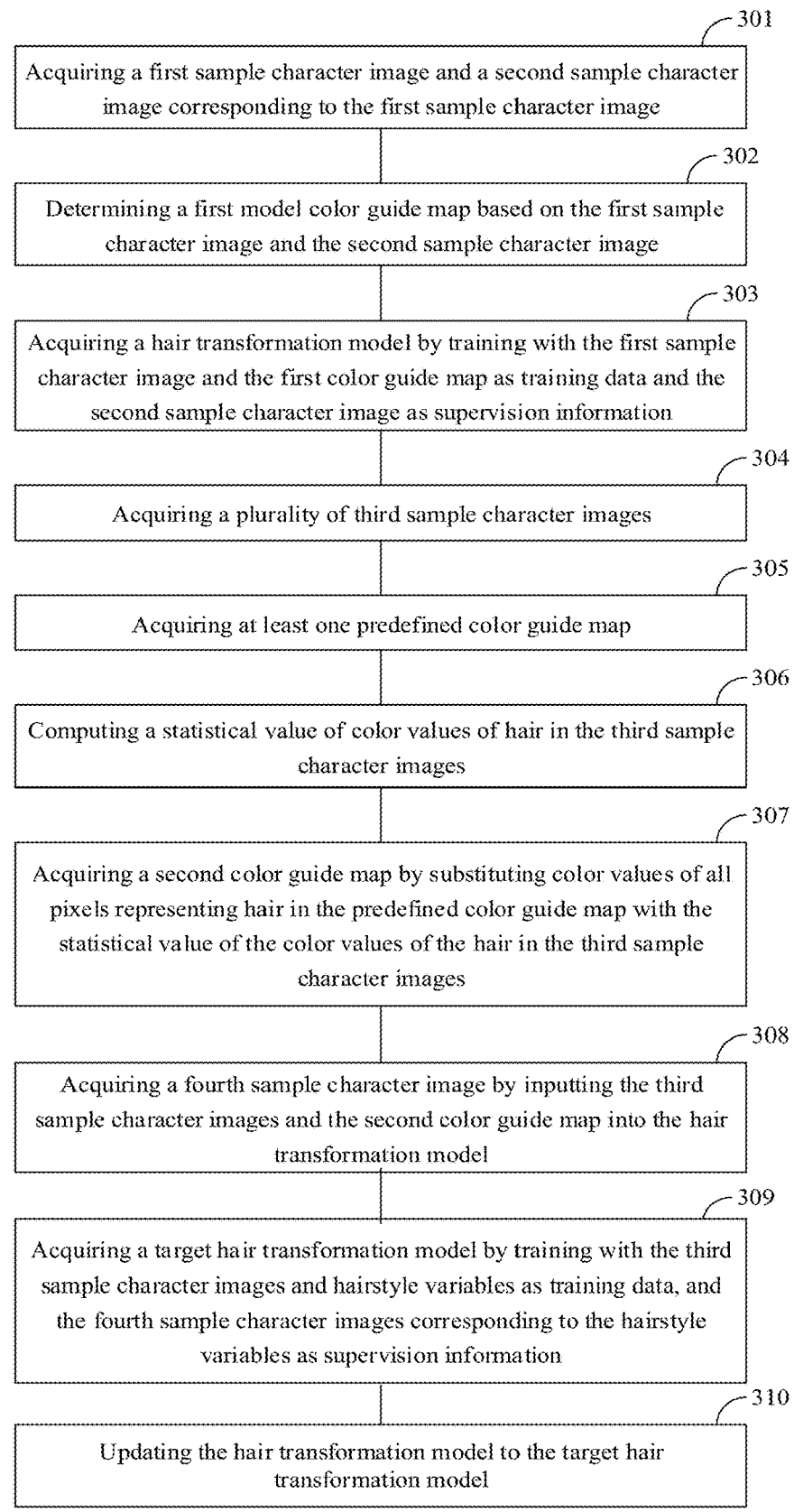
FIG. 13 illustrates a schematic flowchart of another method for generating a hair transformation model according to an embodiment of the present disclosure.

In some embodiments, with reference to FIG. 3, the method further includes 304 to 310 after 303 as illustrated in FIG. 13.

In 304, a plurality of third sample character images are acquired.

In 305, at least one predefined color guide map is acquired.

The at least one predefined color guide map only includes hair with a hairstyle that corresponds to a target hairstyle of the predefined color guide map. That is, each of the at least one predefined color guide map corresponds to one type of the hair generating area. In some embodiments, three different predefined color guide maps are illustrated in a, b, and c in FIG. 14; and a color of hair in each of the predefined color guide maps is white.

In 306, a statistical value of color values of hair in the third sample character images is computed.

In some embodiments, third color values of pixels representing hair in each of the third sample images are determined at first, and then a fourth statistical value of the third color values is computed.

In 307, a second color guide map is acquired by substituting color values of all pixels representing hair in the predefined color guide map with the statistical value of the color values of the hair in the third sample character images.

In some embodiments, a second color guide map corresponding to the each of the third sample images is acquired by substituting fourth color values of pixels representing the hair in the predefined color guide map with the fourth statistical value.

In 308, a fourth sample character image is acquired by inputting the third sample character images and the second color guide map into the hair transformation model.

In some embodiments, a fourth sample image corresponding to the each of the third sample images is acquired by inputting the each of the third sample images and the second color guide map corresponding to the each of the third sample images into the first image processing model.

Figure 14:
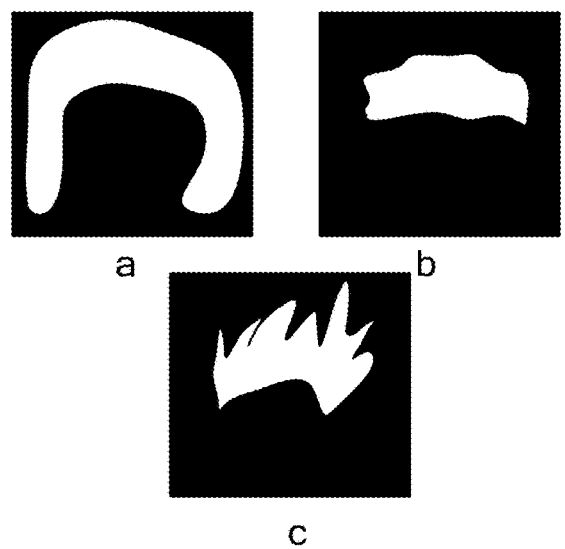
FIG. 14 schematically illustrates predefined color guide maps according to an embodiment of the present disclosure.
Figure 15:
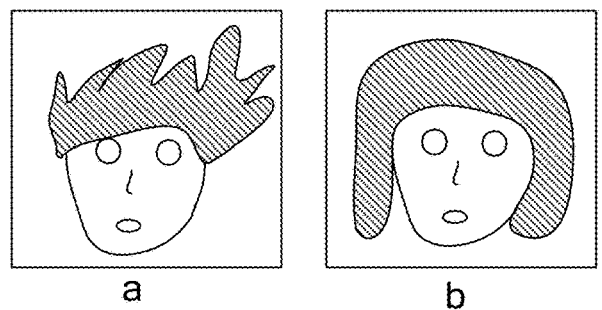
FIG. 15 schematically illustrates a scene for transforming hair according to an embodiment of the present disclosure.

In some embodiments, the fourth sample character image is as illustrated in b in FIG. 15 by taking the third sample character image illustrated in a in FIG. 15 and the second color guide map as illustrated in a in FIG. 14 as examples.

In 309, a target hair transformation model is acquired by training with the third sample character images and hairstyle variables as training data, and the fourth sample character images corresponding to the hairstyle variables as supervision information.

In some embodiments, the target hair transformation model includes a second image processing model, which is acquired by training with the each of the third sample images and hairstyle variables as training data, and the fourth sample images corresponding to the hairstyle variables as supervision information.

The hairstyle variables are in one-to-one correspondence to the target hairstyles. In some embodiments, taking FIG. 14 as an example, the hairstyle variables include 1, 2, and 3 which correspond to a, b, and c in FIG. 14, respectively.

In 310, the hair transformation model is updated to the target hair transformation model.

In some embodiments, the first image processing model is updated to the second image processing model.

In the above embodiment, a large number of new sample data pairs (i.e. the third sample character images and the fourth sample character images) corresponding to different target hairstyles are generated by using a large number of third sample character image based on the hair transformation model that is acquired by training. Then, based on these new third sample character image pairs and hairstyle variables, and the fourth sample character images corresponding to the hairstyle variables, a target character image with a target hairstyle corresponding to a selected hairstyle variable may be acquired by training based on the source character image and the selected hairstyle variable.

In some embodiments, in order to prevent an abnormal value (with a larger R value or G value or B value), which exists in the RGB values of a hair color of a character in a source character image due to factors such as external environment (highlight) or hair treatment (dyeing) performed by the character himself/herself during imaging, from affecting the color distribution of the entire hair, the statistical value of the color values of the hair in all the embodiments above is computed as follows: the RGB values of all the pixels representing colors of the hair are ranked in an ascending order based on the color sum values; then, an average value of the RGB values corresponding to the color sum values with an order falling within a predefined order range is computed, and then taken as the statistical value of the color values of the hair, wherein each of the color sum values is a sum of a R value, a G value and a B value in each of the RGB values. For example, in the case that the first statistical value of the first color values is computed, the pixels corresponding to the first color are ranked in an ascending order based on the color sum values of the RGB values; and the first statistical value of the first color values is computed based on RGB values of a plurality of pixels ranking higher in the order, wherein the first statistical value is an average value of the RGB values of the plurality of pixels ranking higher in the order.

The predefined order range may be 20%-30% of a total order number (just by way of example, which depends on the actual situation). In this way, the abnormal values caused by highlight or highlighted dyeing and the like may be more improbably present in the predefined order range, and if any, only a small part may be present. Therefore, the finally acquired statistical value is prevented from being affected by these abnormal values.

For example, if, by way of example, there are 10 pixels present in a certain part of hair and RGB values corresponding to these 10 pixels include a pixel 1 (122, 254, 0), a pixel 2 (123, 253, 12), a pixel 3 (125, 254, 0), a pixel 4 (122, 254, 10), a pixel 5 (122, 250, 0), a pixel 6 (126, 254, 0), a pixel 7 (222, 255, 255), a pixel 8 (120, 254, 0)), a pixel 9 (122, 254, 30), a pixel 10 (255, 254, 0) in sequence, the color sum values of the ten pixels are 376, 388, 379, 386, 372, 380, 732, 374, 406, and 509 in sequence. Then, an ascending order is as follows: the pixel 5, the pixel 8, the pixel 1, the pixel 3, the pixel 6, the pixel 4, the pixel 2, the pixel 9, the pixel 10, and the pixel 7; and an average value of the RGB values corresponding to the color sum values with the orders falling within the predefined order range (20%-30%) is as follows: ((122+120)/2,(254+254)/2,0)=(121, 254, 0). Then, the statistical value of the color values of this part of the hair is (121, 254, 0).

Figure 16:
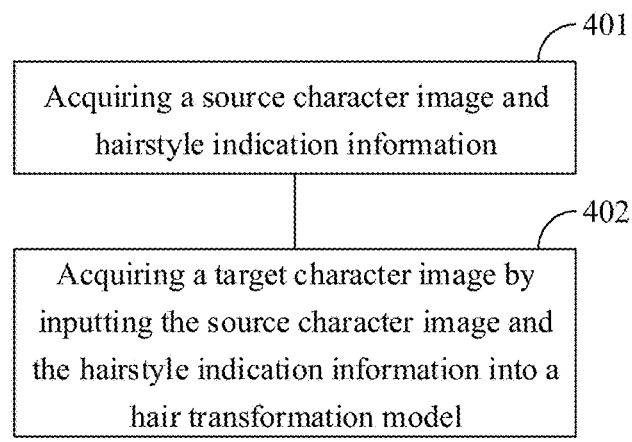
FIG. 16 illustrates a schematic flowchart of a method for transforming hair according to an embodiment of the present disclosure.

Based on the hair transformation model generated by the method for generating the hair transformation model according to the foregoing embodiments, referring to FIG. 16, an embodiment of the present disclosure provides a method for transforming hair, which is applicable to an apparatus for transforming hair. The apparatus for transforming the hair and the apparatus for generating the hair transformation model in the foregoing embodiments are the same apparatus. The apparatus for transforming the hair may be an electronic device, which is the terminal or server in FIG. 1. The method includes 401 and 402.

In 401, a source character image and hairstyle indication information are acquired.

The source character image is a character image shot by the apparatus for transforming the hair with a self-provided camera device in response to a shooting operation of a user, or acquired from other devices by the apparatus for transforming the hair. The source character image may be a single character photo or a frame of character image in a video, which is not specifically limited here.

The hairstyle indication information is configured to indicate a target hair generating area. That is, the hairstyle indication information is configured to determine a hairstyle of the target character image. In some embodiments, the source character image includes a first source image before image processing; and the hairstyle indication information includes first hairstyle indication information, which is configured to indicate a first hair generating area.

In 402, a target character image is acquired by inputting the source character image and the hairstyle indication information into a hair transformation model.

The hair transformation model is acquired by using the method for generating the hair transformation model according to the foregoing embodiments. A hairstyle of a character in the target character image is a hairstyle corresponding to the target hair generating area indicated by the hairstyle indication information, and a similarity between a hair color of the character image in the target character image and a hair color of the character image in the source character image is greater than a predefined value.

In some embodiments, the predefined value is determined according to actual needs. The similarity in hair color statistically refers to a difference between a statistical value (for example, an average value, a variance, a standard difference, etc.) related to the color values of the hair of the target character image and a statistical value related to the color values of the hair of the source character image. The smaller the difference, the greater the similarity; and the greater the difference, the smaller the similarity.

In some embodiments, the hair transformation model includes a first image processing model. The target character image includes a first target image acquired after image processing. The first target image is acquired by inputting the first source image and the first hairstyle indication information into the first image processing model.

In some embodiments, taking a character image illustrated in a in FIG. 15 as the source character image as an example, this character image has a short hairstyle; an image illustrated in b in FIG. 15 may be acquired after 402, where the character in this image has a long hairstyle, with a color similar to a color of the hair in the character image illustrated in a in FIG. 15.

In the above embodiments, when the apparatus for transforming the hair needs to perform a hair transformation function, a target character image with a hair color highly consistent with the hair color of the source character image after the hair transformation may be acquired by using the source character image, since the hair transformation model is generated by using the technical solution according to the foregoing embodiments.

Figure 17:
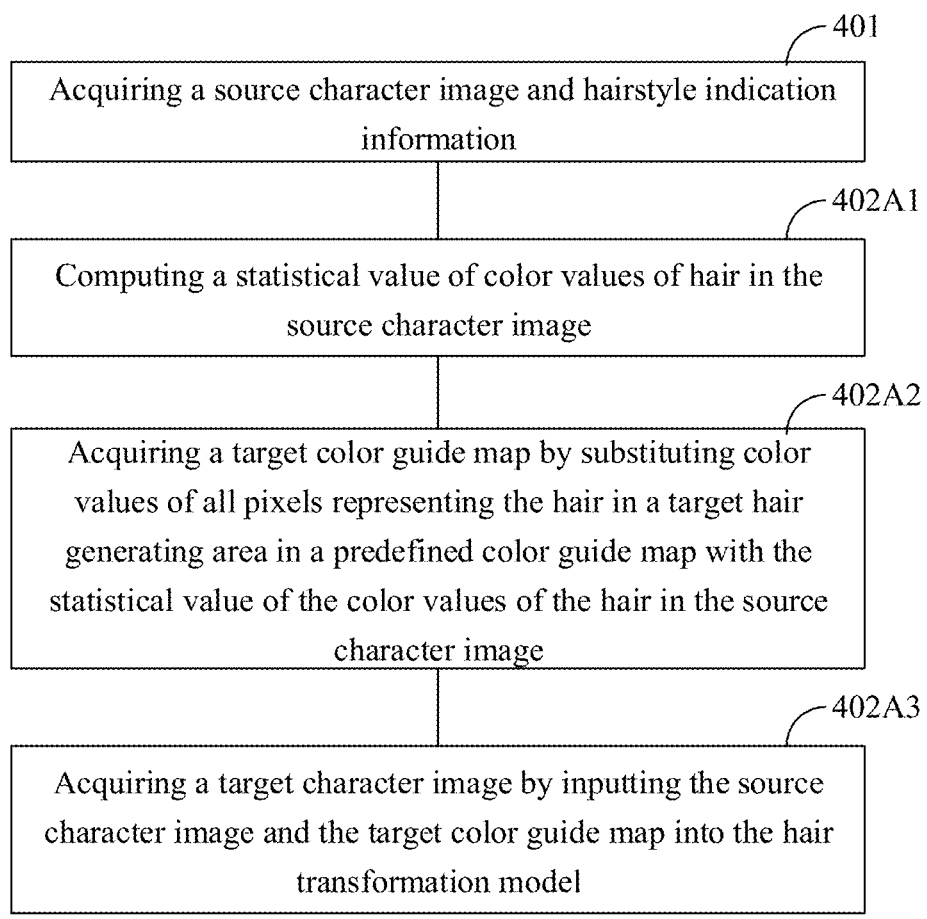
FIG. 17 illustrates a schematic flowchart of another method for transforming hair according to an embodiment of the present disclosure.

In some embodiments, with reference to the embodiment corresponding to FIG. 3 and as illustrated in FIG. 17, 402 specifically includes 402A1 to 402A3 when the hairstyle indication information includes a predefined color guide map that includes a target hair generating area.

In 402A1, a statistical value of color values of hair in the source character image is computed.

A reference may be made to the expression in the foregoing embodiments for a computing method, which is not repeated here.

In some embodiments, the source character image includes a first source image. Target color values of pixels representing hair in the source image are first determined, and then a target statistical value of the target color values is computed.

In 402A2, a target color guide map is acquired by substituting color values of all pixels representing the hair in a target hair generating area in a predefined color guide map with the statistical value of the color values of the hair in the source character image.

The predefined color guide map only includes hair which has a target hairstyle but no color (which is transparent or white); and the predefined color guide map is stored in advance.

In some embodiments, the target hair generating area includes a first hair generating area; and a target color guide map is acquired by substituting fifth color values of pixels representing the hair in the first hair generating area with the target statistical value.

In 402A3, a target character image is acquired by inputting the source character image and the target color guide map into the hair transformation model.

In some embodiments, the target character image includes a first target image; and the first target image is acquired by inputting the first source image and the target color guide map into the first image processing model.

In the above embodiment, a target color guide map is determined by using a source character image, and then, a target character image may be acquired by inputting the source character image and the target color guide map into the hair transformation model generated by using the technical solution according to the foregoing embodiments. Compared with the prior art, a target character image with a hair color highly consistent with the hair color of the source character image after the hair transformation may be acquired by using the source character image, since the hair transformation model is generated by using the technical solution according to the foregoing embodiments.

Figure 18:
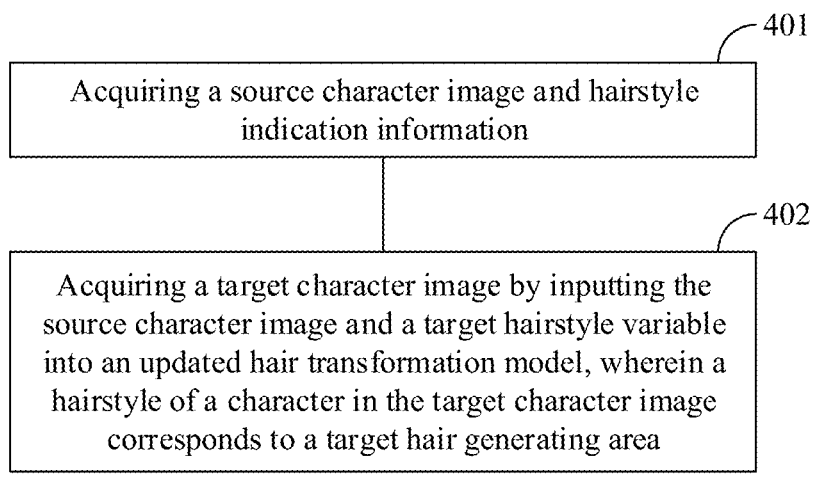
FIG. 18 illustrates a schematic flowchart of another method for transforming hair according to an embodiment of the present disclosure.

In some embodiments, with reference to an embodiment corresponding to FIG. 13, in the case that the hair transformation model is updated to the target hair transformation model acquired by the method for generating the hair transformation model according to the foregoing embodiments, the hairstyle indication information includes a target hairstyle variable corresponding to the target hair generating area; referring to FIG. 18, 402 specifically includes: acquiring a target character image by inputting the source character image and the target hairstyle variable into the updated hair transformation model, wherein a hairstyle of a character in the target character image corresponds to the target hair generating area.

In some embodiments, the target hair transformation model includes a second image processing model, the target hair generating area includes a second hair generating area, and the target character image includes a second target image. A second source image and second hairstyle indication information are acquired; the second hairstyle indication information includes a target hairstyle variable corresponding to the second hair generating area; a second target image is acquired by inputting the second source image and the target hairstyle variable into the second image processing model; and a hairstyle of a character in the second target image corresponds to the second hair generating area.

The target hairstyle variable includes any one of the hairstyle variables, and the hairstyle of the character in the target character image includes a target hairstyle corresponding to a target hairstyle variable. In some embodiments, when the apparatus for transforming the hair is an electronic device, the target hairstyle variable is acquired by displaying a plurality of hairstyle variables on a display screen of the electronic device, and acquiring the target hairstyle variable in response to a click operation performed on the target hairstyle variable.

In some embodiments, taking an image illustrated in a in FIG. 15 as the source character image, 1 as the target hairstyle variable and the target hairstyle corresponding to the target hairstyle variable as illustrated in a in FIG. 14 by way of example, the target character image finally acquired at 402 is as illustrated in b in FIG. 15.

In the above embodiment, after one target hairstyle variable is acquired, a desired target character image may be acquired by inputting the source character image and the target hairstyle variable into the updated hair transformation model (the target hair transformation model).

Described above mainly introduces the solutions according to the embodiments of the present disclosure from the perspective of the apparatus for transforming the hair (such as the electronic device (the terminal/server)). It should be understood that, in order to implement the above method, the apparatus for generating the hair transformation model includes corresponding hardware structures and/or software modules for executing the methods and processes. These corresponding hardware structures and/or software modules for executing the methods and processes may form an apparatus for generating a hair transformation model. The same applies to the apparatus for transforming the hair. Those skilled in the art is easy to realize that the present disclosure may be implemented in the form of hardware or a combination of hardware and computer software in conjunction with the algorithms and steps of the examples described in the embodiments disclosed herein. Whether a function is executed by hardware or computer software-driven hardware depends on the specific application of the technical solution and design constraints. Those skilled in the art may implement the described functions by using different methods for each specific application, but such implementation should not be construed as going beyond the scope of the present disclosure.

The embodiments of the present disclosure divide the functional modules of the apparatus for transforming the hair based on the above method examples. For example, the apparatus for generating the hair transformation model or the apparatus for transforming the hair may be divided into individual functional modules corresponding to individual functions, or, two or more functions may be integrated into one processing module. The integrated modules may be implemented in the form of hardware or software function modules. It should be noted that the division of the modules in the embodiments of the present disclosure is only a logical functional division for an illustrative purpose, and may be implemented in other modes.

Figure 19:
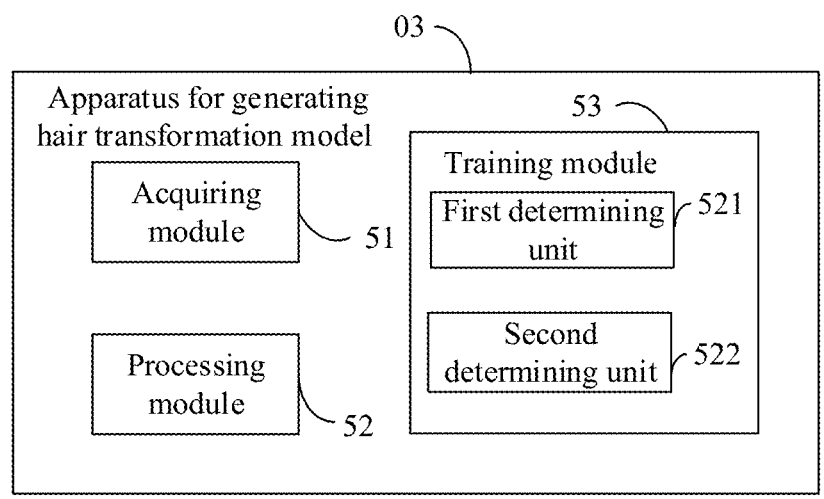
FIG. 19 illustrates a schematic structural diagram of an apparatus for transforming hair according to an embodiment of the present disclosure.

In the case where individual functional modules are divided in correspondence to individual functions, FIG. 19 illustrates a possible schematic structural diagram of an apparatus 03 for generating a hair transformation model. The apparatus 03 for generating the hair transformation model includes: an acquiring module 51, a processing module 52, and a training module 53.

The acquiring module 51 is configured to acquire a first sample character image and a second sample character image corresponding to the first sample character image, wherein the second sample character image is acquired based on the first sample character image, and a hairstyle of a character in the second sample character image is different from that in the first sample character image.

The processing module 52 is configured to determine a first color guide map based on the first sample character image and the second sample character image acquired by the acquiring module 51, wherein the first color guide map includes a hair generating area which is the same as a hair segmenting area in the second sample character image, and a color of the hair generating area in the first color guide map is acquired based on a color of hair in the first sample character image.

The training module 53 is configured to acquire a hair transformation model by training based on the first sample character image acquired by the acquiring module 51 and the first color guide map determined by the processing module 52 as training data, and the second sample character image acquired by the acquiring module 51 as supervision information.

In some embodiments, the processing module 52 specifically includes a first determining unit 521 and a second determining unit 522.

The first determining embodiment 521 is configured to determine a target hair mask map of the second sample character image acquired by the acquiring module 51.

The second determining unit 522 is configured to determine a first color guide map based on color values of hair in the first sample character map acquired by the acquiring module 51, the target hair mask map determined by the first determining unit 521, and color values of hair corresponding to the target hair mask map.

In some embodiments, the second determining unit 522 is specifically configured to compute a statistical value of the color values of the hair in the first sample character image; and acquire the first color guide map by substituting color values of all pixels representing hair in the target hair mask map determined by the first determining unit 521 with the statistical value of the color values of the hair in the first sample character image.

In some embodiments, in the case that an area of the hair in the second sample character image is larger than an area of the hair in the first sample character image, the color of the hair generating area in the first color guide map is acquired based on the color of the hair in the first sample character image and the color of the hair in the second sample character image.

The second determining unit 522 is specifically configured to compute a statistical value of the color values of the hair in the first sample character image acquired by the acquiring module 51, and a statistical value of color values of hair corresponding to a second area, other than a first area corresponding to an area of hair in the first sample character image, in the target hair mask map determined by the first determining unit 521; and acquire the first color guide map by substituting color values of all pixels representing hair in the first area with the statistical value of the color values of the hair in the first sample character image, and substituting color values of all pixels representing hair in the second area with the statistical value of the color values of the hair corresponding to the second area.

In some embodiments, in the case that the area of the hair in the first sample character image is larger than the area of the hair in the second sample character image, the second determining unit 522 is specifically configured to compute a statistical value of color values of hair in a third area, corresponding to an area of the hair in the target hair mask map determined by the first determining unit 521, in the first sample character image acquired by the acquiring module 51; and acquire the first color guide map by substituting the color values of all pixels representing hair in the target hair mask map with the statistical value of the color values of the hair in the third area.

In some embodiments, after the training module 53 acquires the hair transformation model by training, the acquiring module 51 is further configured to acquire a plurality of third sample character images, and acquire at least one predefined color guide map, wherein each of the at least one predefined color guide map corresponds to one type of hair generating area; the second determining unit 522 is further configured to compute a statistical value of hair color values in each of the third sample character images acquired by the acquiring module 51, and acquire a second color guide map by substituting color values of all pixels representing hair in each of the at least one predefined color guide map acquired by the acquiring module 51 with the statistical value of the color values of the hair in the each of the third sample character images; the acquiring module 51 is further configured to a acquire fourth sample character image by inputting the each of the third sample character images and the second color guide map acquired by the second determining unit 522 into the training module 53 into the hair transformation model acquired by training; the training module 53 is further configured to acquire a target hair transformation module by training with the each of the third sample character images acquired by the acquiring module 51 and the hairstyle variables as training data, and the fourth sample character images corresponding to the hairstyle variables as supervision information, wherein the hairstyle variables are in one-to-one correspondence to the hair generating areas; and the training module 53 is further configured to update the hair transformation model to the target hair transformation model.

In some embodiments, the second determining unit 522 is specifically configured to rank the RGB values of all the pixels representing hair colors in an ascending order based on color sum values, compute an average value of the RGB values corresponding to the color sum values with an order falling within a predefined order range, and take the average value of the RGB values corresponding to the color sum values with the order falling within the predefined order range as the statistical value of the color values of the hair, wherein each of the color sum values is a sum of an R value, a G value, and a B value in each of the RGB values.

With respect to the apparatus for generating the hair transformation model in the embodiments above, the operations of respective modules and the corresponding beneficial effects have been described in detail in the above embodiments of the method for generating the hair transformation model, which are not described in detail herein any further.

Figure 20:
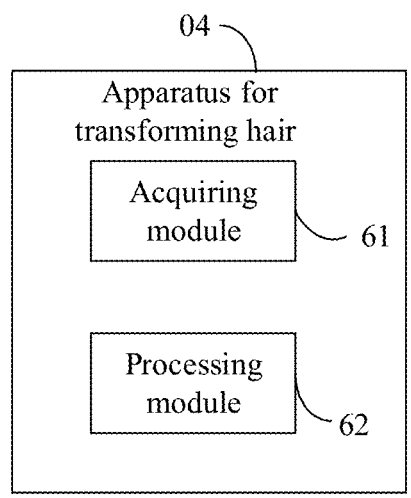
FIG. 20 illustrates a schematic structural diagram of an apparatus for generating a hair transformation model according to an embodiment of the present disclosure.

In the case that individual functional modules are divided in correspondence to individual functions, FIG. 20 illustrates a possible schematic structural diagram of an apparatus 04 for transforming hair. The apparatus 04 for transforming hair includes an acquiring module 61 and a processing module 62.

The acquiring module 61 is configured to acquire a source character image and hairstyle indication information, wherein the hairstyle indication information is configured to indicate a target hair generating area.

The processing module 62 is configured to acquire a target character image by inputting the source character image and hairstyle indication information acquired by the acquiring module 61 into the hair transformation mode, wherein the hair transformation model is acquired by the method for generating the hair transformation model according to the first aspect; a hairstyle of a character in the target character image is a hairstyle corresponding to the target hair generating area indicated by the hairstyle indication information; and a similarity between a hair color of the character in the target character image and a hair color of a character in the source character image is greater than a predefined value.

In some embodiments, the hairstyle indication information includes a predefined color guide map including a target hair generating area. The processing module 62 is specifically configured to compute a statistical value of color values of the hair in the source character image acquired by the acquiring module 61; acquire a target color guide map by substituting color values of all pixels representing the hair in the target hair generating area in the predefined color guide map acquired by the acquiring module 61 with the statistical value of the color values of the hair in the source character image; and acquire a target character image by inputting the source character image acquired by the acquiring module 61 and the target color guide map into the hair transformation module.

In some embodiments, in the case that the hair transformation model is updated to the target hair transformation model acquired by the method for generating the hair transformation model according to the first aspect, the hairstyle indication information includes a target hairstyle variable corresponding to the target hair generating area; and the processing module 62 is specifically configured to acquire a target character image by inputting the source character image and target hairstyle variable acquired by the acquiring module 61 into the updated hair transformation model, wherein a hairstyle of a character in the target character image corresponds to the target hair generating area.

With respect to the apparatus for transforming the hair in the embodiments above, the specific manner of respective modules to execute the operation and the corresponding beneficial effects have been described in detail in the foregoing embodiments of the method for transforming the hair, which is not described in detail herein any further.

Figure 21:
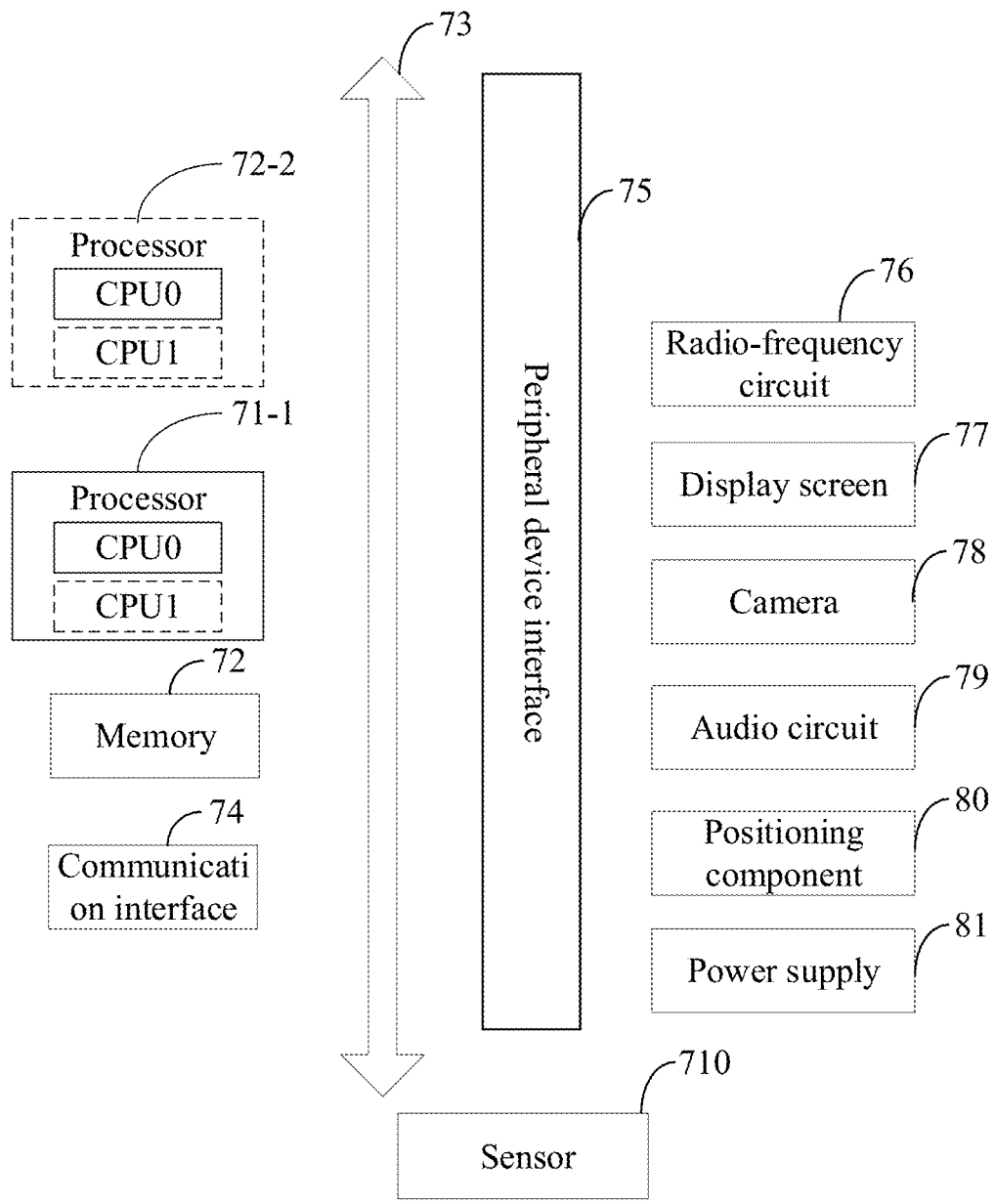
FIG. 21 illustrates a schematic structural diagram of an electronic device according to an embodiment of the present disclosure.

FIG. 21 illustrates a schematic structural diagram of a possible structure of an electronic device according to an embodiment of the present disclosure. The electronic device is the apparatus 03 for generating the hair transformation model and/or the apparatus 04 for transforming hair described above. As illustrated in FIG. 21, the electronic device includes a processor 71 and a memory 72. The memory 72 is configured to store an instruction executable by the processor 71, and the processor 71 may implement the functions of the respective modules in the apparatus 03 for generating the hair transformation model and/or the apparatus 04 for transforming hair according to the embodiments described above. The memory 72 stores at least one instruction, and the at least one instruction is loaded and executed by the processor 71 to implement the method for generating the hair transformation model and/or the method for transforming hair according to the respective method embodiments described above.

During specific implementation, as an embodiment, the processor 71 (71-1 and 71-2) includes one or more CPUs, for example, a CPU0 and a CPU1 illustrated in FIG. 21. Further, as an embodiment, the electronic device includes a plurality of processors 71, for examples, a processor 71-1 and a processor 71-2 illustrated in FIG. 21. Each CPU in these processors 71 may be a single-core processor (Single-CPU) or a multi-core processor (Multi-CPU). The processor 71 here refers to one or more devices, circuits, and/or processing cores for processing data (for example, computer program instructions).

The memory 72 is a read-only memory (ROM) or other types of static storage devices capable of storing static information and instructions, or a random-access memory (RAM) or other types of dynamic storage devices capable of storing information and instructions. The memory 72 may also be an electrically erasable programmable read-only memory (EEPROM), a compact disc read-only memory (CD-ROM) or other optical disk storage, optical disk storage (including compact discs, laser discs, optical discs, digital versatile discs, Blu-ray discs, etc.), a magnetic disk computer storage media or other magnetic storage devices, or any other media capable of carrying or storing desired program codes in a structural form of instructions or data and capable of being accessed by a computer, but not limited thereto. The memory 72 exists alone and is connected to the processor 71 through the bus 73. The memory 72 may also be integrated with the processor 71.

The bus 73 is an industry standard architecture (ISA) bus, a peripheral component interconnect (PCI) bus, or an extended industry standard architecture (EISA) bus. The bus 73 is divided into an address bus, a data bus, a control bus, and the like. For ease of representation, only one bold line is used in FIG. 21 for representation, which however is not intended to indicate that only one bus or one type of bus exists.

In addition, the electric device includes a communication interface 74, in order to facilitate information interaction between the electronic device and other devices (for example, the information interaction with a server when the electronic device is a terminal, or the information interaction with a terminal when the electronic device is a server). The communication interface 74 is configured to communicate with other devices or communication networks, such as control systems, radio access networks (RAN), and wireless local area networks (WLAN), by using any devices such as a transceiver. The communication interface 74 includes a receiving unit to implement a receiving function, and a sending unit to implement a sending function.

In some embodiments, the electronic device in the case of a terminal may optionally further include: a peripheral device interface 75 and at least one peripheral device. The processor 71, the memory 72, and the peripheral device interface 75 may be connected with one another by buses 73 or signal lines. Each peripheral device may be connected to the peripheral device interface 75 by a bus 73, a signal line or a circuit board. Specifically, the peripheral device includes at least one of a radio-frequency circuit 76, a display screen 77, a camera 78, an audio circuit 79, a positioning component 80, and a power supply 81.

The peripheral device interface 75 may be configured to connect at least one peripheral device related to input/output (I/O) to the processor 71 and the memory 72. In some embodiments, the processor 71, the memory 72 and the peripheral device interface 75 are integrated on the same chip or circuit board; and in some other embodiments, any one or two of the processor 71, the memory 72 and the peripheral device interface 75 may be implemented on a separate chip or circuit board, which is not limited in this embodiment.

The radio-frequency circuit 76 is configured to receive and transmit RF (radio frequency) signals, which are also named as electromagnetic signals. The radio-frequency circuit 76 communicates with a communication network and other communication devices through electromagnetic signals. The radio-frequency circuit 76 converts electrical signals into electromagnetic signals for transmission, or converts received electromagnetic signals into electrical signals. In some embodiments, the radio-frequency circuit 404 includes: an antenna system, an RF transceiver, one or more amplifiers, a tuner, an oscillator, a digital signal processor, a codec chipset, a user identity module card, etc. The radio-frequency circuit 76 communicates with other devices through at least one wireless communication protocol. The wireless communication protocol includes but is not limited to: metropolitan area networks, various generations of mobile communication networks (2G, 3G, 4G, and 5G), wireless local area networks and/or wireless fidelity (Wi-Fi) networks. In some embodiments, the radio-frequency circuit 76 may further include a circuit related to near field communication (NFC), which is not limited in the present disclosure.

The display screen 77 is configured to display a user interface (UI). The UI includes graphics, text, icons, videos, and any combination thereof. When the display screen 77 is a display screen, the display screen 77 is further capable of collecting touch signals on or above a surface of the display screen 77. The touch signals are input to the processor 71 as control signals for processing. Here, the display screen 77 may be further configured to provide virtual buttons and/or a virtual keyboard, which are also named as soft buttons and/or a soft keyboard. In some embodiments, one display screen 77 is disposed, and is provided with a front panel of the electronic device; and the display screen 77 is made from materials such as a liquid crystal display (LCD) and an organic light-emitting diode (OLED).

The camera component 78 is configured to capture images or videos. In some embodiments, the camera component 78 includes a front camera and a rear camera. The front camera is typically provided on the front panel of the electronic device, and the rear camera is provided on the back of the electronic device. The audio circuit 79 includes a microphone and a speaker. The microphone is configured to collect sound waves from a user and the environment, and convert the sound waves into electrical signals, which are input to the processor 71 for processing, or input to the radio-frequency circuit 76 to enable voice communication. For the purposes of stereo collection or noise reduction, a plurality of microphones are provided, and disposed on different parts of the electronic device, respectively. The microphone may also be an array microphone or an omnidirectional acquisition type microphone. The speaker is configured to convert the electrical signals from the processor 71 or the radio-frequency circuit 76 into sound waves. The speaker may be a traditional thin-film speaker or a piezoelectric ceramic speaker. The speaker in the case of the piezoelectric ceramic speaker is capable of converting the electrical signals into sound waves audible to human beings, and converting the electrical signals into sound waves inaudible to human beings for distance measurement and other purposes. In some embodiments, the audio circuit 79 also includes a headphone jack.

The positioning component 80 is configured to position a current geographic location of the electronic device to implement navigation or a location-based service (LBS). The positioning component 80 may be the United States' Global Positioning System (GPS), Russia's Global Navigation Satellite System (GLONASS), China's BeiDou Navigation Satellite System (BDS), and the European Union's Galileo.

The power supply 81 is configured to supply power to various components in the electronic device. The power supply 81 is alternating-current power, direct-current power, a disposable battery, or a rechargeable battery. The power supply 81, when including the rechargeable battery, supports wired charging or wireless charging. The rechargeable battery is further configured to support the quick charge technology.

In some embodiments, the electronic device further includes one or more sensors 710. The one or more sensors 710 include, but not limited to: an acceleration sensor, a gyroscope sensor, a pressure sensor, a fingerprint sensor, an optical sensor, and a proximity sensor.

The acceleration sensor may detect the magnitudes of accelerations on three coordinate axes of a coordinate system that is established based on the electronic device. The gyroscope sensor may detect a body direction and a rotation angle of the electronic device, and may capture 3D actions of a user on the electronic device in cooperation with the acceleration sensor. The pressure sensor is provided on a layer immediately below a side frame and/or display screen 77 of the electronic device. The pressure sensor, when provided on the side frame of the electronic device, may detect signals indicating holding of the electronic device by the user. The fingerprint sensor is configured to collect a fingerprint of the user. The optical sensor is configured to collect the intensity of ambient light. The proximity sensor, also named as a distance sensor, is typically provided on the front panel of the electronic device. The proximity sensor is configured to collect a distance between the user and the front of the electronic device.

Those skilled in the art may understand that the electronic device is not limited by the structure illustrated in FIG. 21, and may include more or fewer components than those illustrated, or a combination of certain components, or have components arranged in a different fashion.

In some embodiments, the electronic device includes the apparatus 03 for generating the hair transformation model and the apparatus 04 for transforming hair. The electronic device includes: a processor, and a memory configured to store at least one computer program including at least one instruction executable by the processor; wherein the at least one computer program, when loaded and run by the processor, causes the processor to execute instructions for:

acquiring a first sample image and a second sample image, wherein the second sample image and the first sample image include the same character with different hairstyles;

determining a first color guide map based on the first sample image and the second sample image, wherein a hair generating area in the first color guide map is the same as a second hair segmenting area of the second sample image, and a color of the hair generating area is acquired based on pixels representing hair in a first hair segmenting area of the first sample image;

acquiring a first image processing model by training with the first sample image and the first color guide map as training data and the second sample image as supervision information; and transforming, based on the first image processing model, hair in an image selected by a user.

In some embodiments, the at least one computer program, when loaded and run by the processor, causes the processor to execute instructions for:

determining a target hair mask map of the second sample image, wherein the target hair mask map is configured to indicate the second hair segmenting area;

determining first color values of pixels representing hair in the first sample image;

determining second color values of pixels representing hair in the target hair mask map; and determining the first color guide map based on the first color values, the target hair mask map, and the second color values.

In some embodiments, the at least one computer program, when loaded and run by the processor, causes the processor to execute instructions for:

computing a first statistical value of the first color values; and acquiring the first color guide map by substituting the second color values of pixels representing the hair in the target hair mask map with the first statistical value.

In some embodiments, the at least one computer program, when loaded and run by the processor, causes the processor to execute instructions for:

ranking pixels corresponding to a first color in an ascending order based on color sum values of RGB values, wherein each of the color sum values is a sum of an R, a G value and a B value in each of the RGB values; and computing the first statistical value of the first color values based on RGB values of a plurality of pixels ranking higher in the order, wherein the first statistical value is an average value of the RGB values of the plurality of pixels ranking higher in the order.

In some embodiments, in the case that the second hair segmenting area is larger than the first hair segmenting area, a color of the hair generating area is acquired based on pixels representing hair in the first hair segmenting area and pixels representing hair in the second hair segmenting area, the at least one computer program, when loaded and run by the processor, causes the processor to execute instructions for:
  computing a first statistical value of the first color values and a second statistical value corresponding to a second area of the target hair mask map, wherein the second area is an area other than a first area in the target hair mask map, and the first area is an area corresponding to the first hair segmenting area in the target hair mask map; and
  acquiring the first color guide map by substituting the second color values of pixels representing hair in the first area with the first statistical value, and substituting the second color values of pixels representing hair in the second area with the second statistical value.

In some embodiments, in the case that the first hair segmenting area is larger than the second hair segmenting area, the at least one computer program, when loaded and run by the processor, causes the processor to execute instructions for:
  computing a third statistical value corresponding to a third area of the first hair segmenting area based on the first color values, wherein the third area corresponds to an area representing the hair in the target hair mask map; and
  acquiring the first color guide map by substituting the second color values of pixels in the area representing the hair in the target hair mask map with the third statistical value corresponding to the third area.

In some embodiments, the at least one computer program, when loaded and run by the processor, causes the processor to execute instructions for:
  acquiring a plurality of third sample images;
  acquiring at least one predefined color guide map, wherein each of the at least one predefined color guide map corresponds to one type of the hair generating area;
  determining third color values of pixels representing hair in each of the third sample images, and computing a fourth statistical value of the third color values;
  acquiring a second color guide map corresponding to the each of the third sample images by substituting fourth color values of pixels representing hair in each of the at least one predefined color guide map with the fourth statistical value;
  acquiring a fourth sample image corresponding to the each of the third sample images by inputting the each of the third sample images and the second color guide map corresponding to the each of the third sample images into the first image processing model;
  acquiring a second image processing model by training with the each of the third sample images and hairstyle variables as training data, and the fourth sample images corresponding to the hairstyle variables as supervision information, wherein the hairstyle variables are in one-to-one correspondence to the hair generating areas; and
  updating the first image processing model to the second image processing model.

In some embodiments, an electronic device serves as the apparatus for transforming hair 04, and includes: a processor, and a memory configured to store at least one computer program including at least one instruction; wherein the at least one computer program, when loaded and run by the processor, causes the processor to execute instructions for:
  acquiring a first source image selected by the user and first hairstyle indication information, wherein the first hairstyle indication information is configured to indicate a first hair generating area; and
  acquiring a first target image by inputting the first source image and the first hairstyle indication information into the first image processing model, wherein a hairstyle of a character in the first target image is a hairstyle corresponding to the first hair generating area, and a similarity between a hair color of the character in the first target image and a hair color of a character in the first source image is greater than a predefined value.

In some embodiments, the first hairstyle indication information includes a predefined color guide map, wherein the predefined color guide map includes the first hair generating area; and the at least one computer program, when loaded and run by the processor, causes the processor to execute instructions for:
  determining target color values of pixels representing hair in the first source image;
  computing a target statistical value of the target color values;
  acquiring a target color guide map by substituting fifth color values of pixels representing the hair in the first hair generating area with the target statistical value; and
  acquiring the first target image by inputting the first source image and the target color guide map into the first image processing model.

In some embodiments, the at least one computer program, when loaded and run by the processor, causes the processor to execute instructions for:
  acquiring a second source image selected by the user and second hairstyle indication information, wherein the second hairstyle indication information includes a target hairstyle variable corresponding to a second hair generating area; and
  acquiring a second target image by inputting the second source image and the target hairstyle variable into the second image processing model, wherein a hairstyle of a character in the second target image corresponds to the second hair generating area.

An embodiment of the present disclosure further provides a non-volatile computer storage medium storing at least one computer program including at least one instruction, wherein the at least one computer program, when loaded and run by a processor of an electronic device, causes the electronic device to perform the method for transforming hair according to the embodiments described above.

An embodiment of the present disclosure further provides a non-volatile computer storage medium storing at least one computer program including at least one instruction, wherein the at least one computer program, when loaded and run by a processor of an electronic device, causes the electronic device to perform the method for generating the hair transformation model according to the embodiments described above.

An embodiment of the present disclosure further provides a computer program product including at least one instruction, wherein the computer program product, when run by a computer, causes the computer to perform the method for generating the hair transformation model according to the embodiments described above.

An embodiment of the present disclosure further provides a computer program product including at least one instruction, wherein the computer program product, when run by a computer, causes the computer to perform the method for transforming the hair according to the embodiments described above.

Other embodiments of the present disclosure are apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as examples only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. The scope of the present disclosure is only subject to the appended claims.

What is claimed is:

1. A method for transforming hair, comprising:
    acquiring a first sample image and a second sample image, wherein the second sample image and the first sample image comprise a same character with different hairstyles;
    determining a first color guide map based on the first sample image and the second sample image, wherein a hair generating area in the first color guide map is the same as a second hair segmenting area of the second sample image, and a color of the hair generating area is acquired based on pixels representing hair in a first hair segmenting area of the first sample image;
    acquiring a first image processing model by training with the first sample image and the first color guide map as training data and the second sample image as supervision information; and
    transforming, based on the first image processing model, hair in an image selected by a user.

2. The method for transforming the hair according to claim 1, wherein said determining the first color guide map based on the first sample image and the second sample image comprises:
    determining a target hair mask map of the second sample image, wherein the target hair mask map is configured to indicate the second hair segmenting area;
    determining first color values of pixels representing hair in the first sample image;
    determining second color values of pixels representing hair in the target hair mask map; and
    determining the first color guide map based on the first color values, the target hair mask map, and the second color values.

3. The method for transforming the hair according to claim 2, wherein said determining the first color guide map based on the first color values, the target hair mask map, and the second color value comprises:
    computing a first statistical value of the first color values; and
    acquiring the first color guide map by substituting the second color values of the pixels representing the hair in the target hair mask map with the first statistical value.

4. The method for transforming the hair according to claim 3, wherein said computing the first statistical value of the first color values comprises:
    ranking pixels corresponding to a first color in an ascending order based on color sum values of RGB values, wherein each of the color sum values is a sum of an R value, a G value, and a B value in each of the RGB values; and
    computing the first statistical value of the first color values based on RGB values of a plurality of pixels ranking higher in the order than a prescribed pixel, wherein the first statistical value is an average value of the RGB values of the plurality of pixels ranking higher in the order than the prescribed pixel, and a predefined order range of the prescribed pixel is 20%-30% of a total order number.

5. The method for transforming the hair according to claim 2, wherein in response to the second hair segmenting area being larger than the first hair segmenting area, a color of the hair generating area is acquired based on the pixels representing the hair in the first hair segmenting area and pixels representing hair in the second hair segmenting area, said determining the first color guide map based on the first color values, the target hair mask map, and the second color values comprises:
    computing a first statistical value of the first color values and a second statistical value corresponding to a second area of the target hair mask map, wherein the second area is an area other than a first area in the target hair mask map, and the first area is an area corresponding to the first hair segmenting area in the target hair mask map; and
    acquiring the first color guide map by substituting the second color values of pixels representing hair in the first area with the first statistical value, and substituting the second color values of pixels representing hair in the second area with the second statistical value.

6. The method for transforming the hair according to claim 2, wherein in response to the first hair segmenting area being larger than the second hair segmenting area, said determining the first color guide map based on the first color values, the target hair mask map, and the second color values comprises:
    computing a third statistical value corresponding to a third area of the first hair segmenting area based on the first color values, wherein the third area corresponds to an area representing the hair in the target hair mask map; and
    acquiring the first color guide map by substituting the second color values of the pixels representing the hair in the target hair mask map with the third statistical value corresponding to the third area.

7. The method for transforming the hair according to claim 1, further comprising:
    acquiring a plurality of third sample images;
    acquiring at least one predefined color guide map, wherein each of the at least one predefined color guide map corresponds to one type of the hair generating area;
    determining third color values of pixels representing hair in each of the third sample images, and computing a fourth statistical value of the third color values;
    acquiring a second color guide map corresponding to the each of the third sample images by substituting fourth color values of pixels representing hair in each of the at least one predefined color guide map with the fourth statistical value;
    acquiring a fourth sample image corresponding to the each of the third sample images by inputting the each of the third sample images and the second color guide map corresponding to the each of the third sample images into the first image processing model;

acquiring a second image processing model by training with the each of the third sample images and hairstyle variables as training data, and the fourth sample images corresponding to the hairstyle variables as supervision information, wherein the hairstyle variables are in one-to-one correspondence to the hair generating area; and updating the first image processing model to the second image processing model.

8. The method for transforming the hair according to claim 7, wherein said transforming, based on the first image processing model, the hair in the image selected by the user comprises:

acquiring a second source image selected by the user and second hairstyle indication information, wherein the second hairstyle indication information comprises a target hairstyle variable corresponding to a second hair generating area; and acquiring a second target image by inputting the second source image and the target hairstyle variable into the second image processing model, wherein a hairstyle of a character in the second target image corresponds to the second hair generating area.

9. The method for transforming the hair according to claim 1, wherein said transforming, based on the first image processing model, the hair in the image selected by the user comprises:

acquiring a first source image selected by the user and first hairstyle indication information, wherein the first hairstyle indication information is configured to indicate a first hair generating area; and acquiring a first target image by inputting the first source image and the first hairstyle indication information into the first image processing model, wherein a hairstyle of a character in the first target image is a hairstyle corresponding to the first hair generating area, and a similarity between a hair color of the character in the first target image and a hair color of a character in the first source image is greater than a predefined value.

10. The method for transforming the hair according to claim 9, wherein the first hairstyle indication information comprises a predefined color guide map, wherein the predefined color guide map comprises the first hair generating area, said acquiring the first target image by inputting the first source image and the first hairstyle indication information into the first image processing model comprises:

determining target color values of pixels representing hair in the first source image;

computing a target statistical value of the target color values;

acquiring a target color guide map by substituting fifth color values of pixels representing the hair in the first hair generating area with the target statistical value; and acquiring the first target image by inputting the first source image and the target color guide map into the first image processing model.

11. An electronic device, comprising:
a processor; and
a memory configured to store at least one computer program comprising at least one instruction executable by the processor;
wherein the at least one instruction, when executed by the processor, causes the processor to perform a method comprising:

acquiring a first sample image and a second sample image, wherein the second sample image and the first sample image comprise the same character with different hairstyles;

determining a first color guide map based on the first sample image and the second sample image, wherein a hair generating area in the first color guide map is the same as a second hair segmenting area of the second sample image, and a color of the hair generating area is acquired based on pixels representing hair in a first hair segmenting area of the first sample image;

acquiring a first image processing model by training with the first sample image and the first color guide map as training data and the second sample image as supervision information; and transforming, based on the first image processing image, hair in an image selected by a user.

12. The electronic device according to claim 11, wherein said determining the first color guide map based on the first sample image and the second sample image comprises:

determining a target hair mask map of the second sample image, wherein the target hair mask map is configured to indicate the second hair segmenting area;

determining first color values of pixels representing hair in the first sample image;

determining second color values of pixels representing hair in the target hair mask map; and determining the first color guide map based on the first color values, the target hair mask map, and the second color values.

13. The electronic device according to claim 12, wherein said determining the first color guide map based on the first color values, the target hair mask map, and the second color value comprises:

computing a first statistical value of the first color values; and acquiring the first color guide map by substituting the second color values of the pixels representing the hair in the target hair mask map with the first statistical value.

14. The electronic device according to claim 13, wherein said computing the first statistical value of the first color values comprises:

ranking pixels corresponding to a first color in an ascending order based on color sum values of RGB values, wherein each of the color sum values is a sum of an R value, a G value, and a B value in each of the RGB values; and computing the first statistical value of the first color values based on RGB values of a plurality of pixels ranking higher in the order than a prescribed pixel, wherein the first statistical value is an average value of the RGB values of the plurality of pixels ranking higher in the order than the prescribed pixel, and a predefined order range of the prescribed pixel is 20%-30% of a total order number.

15. The electronic device according to claim 12, wherein in response to the second hair segmenting area being larger than the first hair segmenting area, a color of the hair generating area is acquired based on the pixels representing the hair in the first hair segmenting area and pixels representing hair in the second hair segmenting area, said determining the first color guide map based on the first color values, the target hair mask map, and the second color values comprises:

computing a first statistical value of the first color values and a second statistical value corresponding to a second area of the target hair mask map, wherein the second area is an area other than a first area in the target hair mask map, and the first area is an area corresponding to the first hair segmenting area in the target hair mask map; and acquiring the first color guide map by substituting the second color values of pixels representing hair in the first area with the first statistical value, and substituting the second color values of pixels representing hair in the second area with the second statistical value.

16. The electronic device according to claim 12, wherein in response to the first hair segmenting area being larger than the second hair segmenting area, said determining the first color guide map based on the first color values, the target hair mask map, and the second color values comprises:

computing a third statistical value corresponding to a third area of the first hair segmenting area based on the first color values, wherein the third area corresponds to an area representing the hair in the target hair mask map; and acquiring the first color guide map by substituting the second color values of the pixels representing the hair in the target hair mask map with the third statistical value corresponding to the third area.

17. The electronic device according to claim 11, wherein the method further comprises:

acquiring a plurality of third sample images;

acquiring at least one predefined color guide map, wherein each of the at least one predefined color guide map corresponds to one type of the hair generating area;

determining third color values of pixels representing hair in each of the third sample images, and computing a fourth statistical value of the third color values;

acquiring a second color guide map corresponding to the each of the third sample images by substituting fourth color values of pixels representing hair in each of the at least one predefined color guide map with the fourth statistical value;

acquiring a fourth sample image corresponding to the each of the third sample images by inputting the each of the third sample images and the second color guide map corresponding to the each of the third sample images into the first image processing model;

acquiring a second image processing model by training with the each of the third sample images and hairstyle variables as training data, and the fourth sample images corresponding to the hairstyle variables as supervision information, wherein the hairstyle variables are in one-to-one correspondence to the hair generating area; and updating the first image processing model to the second image processing model.

18. The electronic device according to claim 17, wherein said transforming, based on the first image processing model, the hair in the image selected by the user comprises:

acquiring a second source image selected by the user and second hairstyle indication information, wherein the second hairstyle indication information comprises a target hairstyle variable corresponding to a second hair generating area; and acquiring a second target image by inputting the second source image and the target hairstyle variable into the second image processing model, wherein a hairstyle of a character in the second target image corresponds to the second hair generating area.

19. The electronic device according to claim 11, wherein said transforming, based on the first image processing model, the hair in the image selected by the user comprises:

acquiring a first source image selected by the user and first hairstyle indication information, wherein the first hairstyle indication information is configured to indicate a first hair generating area; and acquiring a first target image by inputting the first source image and the first hairstyle indication information into the first image processing model, wherein a hairstyle of a character in the first target image is a hairstyle corresponding to the first hair generating area, and a similarity between a hair color of the character in the first target image and a hair color of a character in the first source image is greater than a predefined value.

20. The electronic device according to claim 19, wherein the first hairstyle indication information comprises a predefined color guide map, wherein the predefined color guide map comprises the first hair generating area, said acquiring the first target image by inputting the first source image and the first hairstyle indication information into the first image processing model comprises:

determining target color values of pixels representing hair in the first source image;

computing a target statistical value of the target color values;

acquiring a target color guide map by substituting fifth color values of pixels representing the hair in the first hair generating area with the target statistical value; and acquiring the first target image by inputting the first source image and the target color guide map into the first image processing model.

* * * * *